United States Patent [19]
Jack et al.

[11] 3,942,967
[45] Mar. 9, 1976

[54] HEAT TREATMENT OF GLASS SHEETS

[75] Inventors: Harry Ross Scarlet Jack, Tanworth-in-Arden; Peter Henry Richards, Kenilworth, both of England

[73] Assignee: Triplex Safety Glass Company Limited, London, England

[22] Filed: Mar. 12, 1974

[21] Appl. No.: 450,373

[30] Foreign Application Priority Data
July 20, 1973  United Kingdom............... 34701/73

[52] U.S. Cl. ..................... 65/114; 65/118; 65/163; 432/6; 432/123
[51] Int. Cl.² .................... C03B 25/04; C03B 29/00
[58] Field of Search ............ 65/104, 114, 118, 119, 65/163, 106; 432/6, 123, 126

[56] References Cited
UNITED STATES PATENTS

| | | | |
|---|---|---|---|
| 3,338,695 | 8/1967 | Ritter, Jr. ........................ | 65/106 X |
| 3,362,806 | 1/1968 | Brewin et al. ..................... | 65/114 |
| 3,630,706 | 12/1971 | Oelke et al. ...................... | 65/104 |
| 3,725,024 | 4/1973 | Sperry ............................ | 65/116 X |

Primary Examiner—Arthur D. Kellogg
Attorney, Agent, or Firm—Burns, Doane, Swecker & Mathis

[57] ABSTRACT

A glass sheet to be heated, for example to a bending or a quenching temperature, is supported on its lower edge in an upright disposition and is advanced along a horizontally disposed path through a furnace. Transient support is provided for the upper edge of the sheet which support is positioned to cause the sheet to lean at a near-vertical angle as it is advanced, and thermal conditions in the furnace as well as the time the sheet is within the furnace are set in dependence on the glass thickness so as to heat the glass to the required temperature while permitting the glass to relax as it is heated only by an amount less than a maximum acceptable deformation of the sheet which depends on the use to which the sheet is to be put.

33 Claims, 25 Drawing Figures

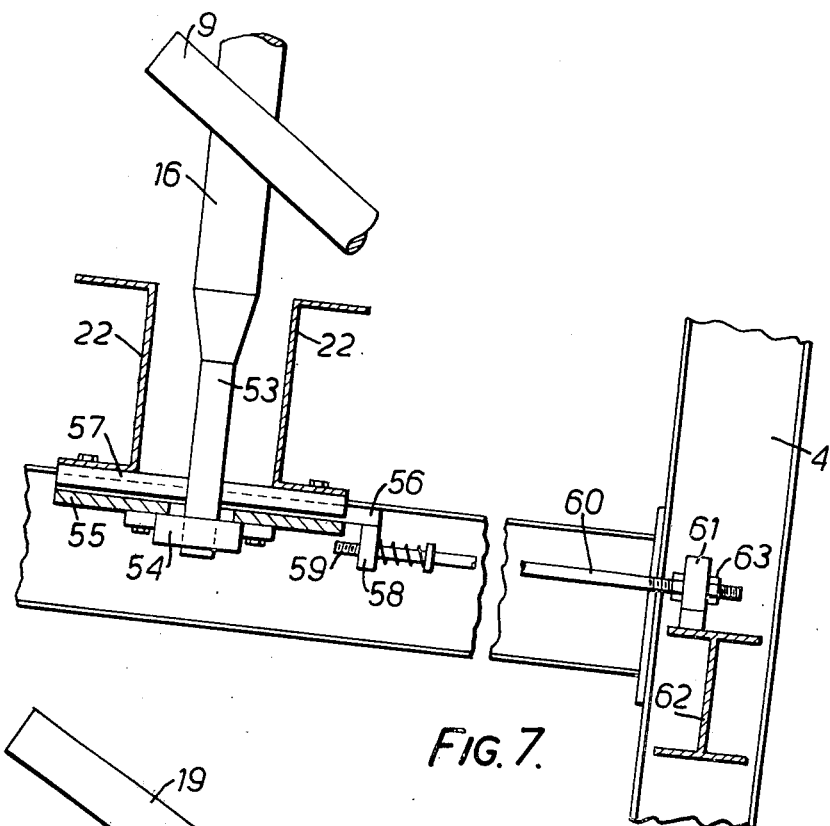
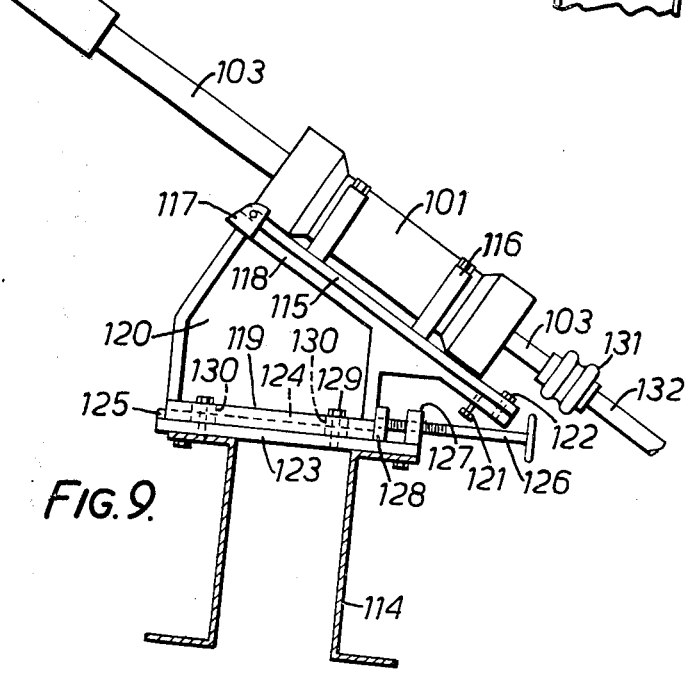

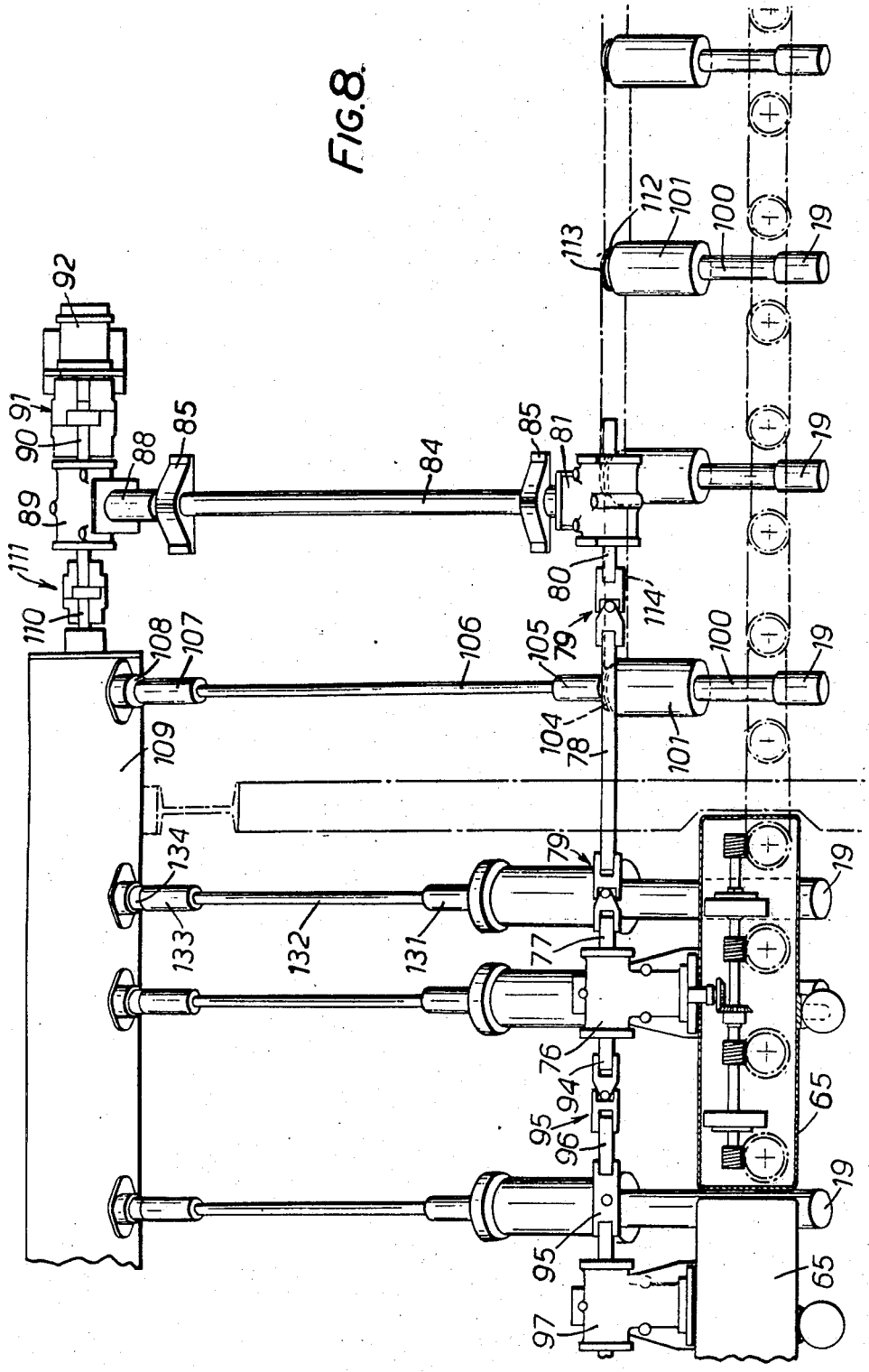

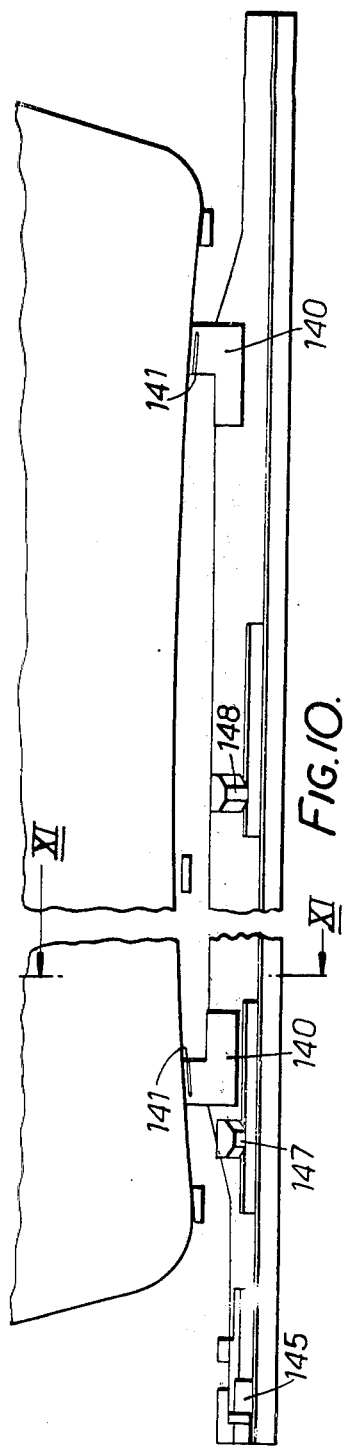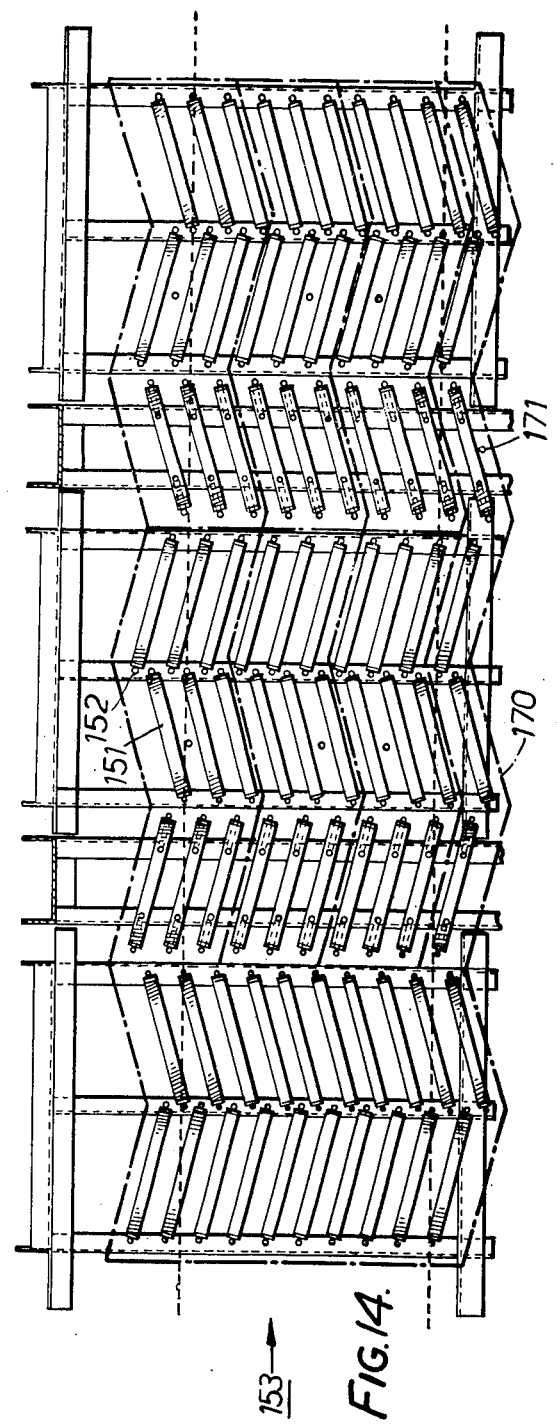

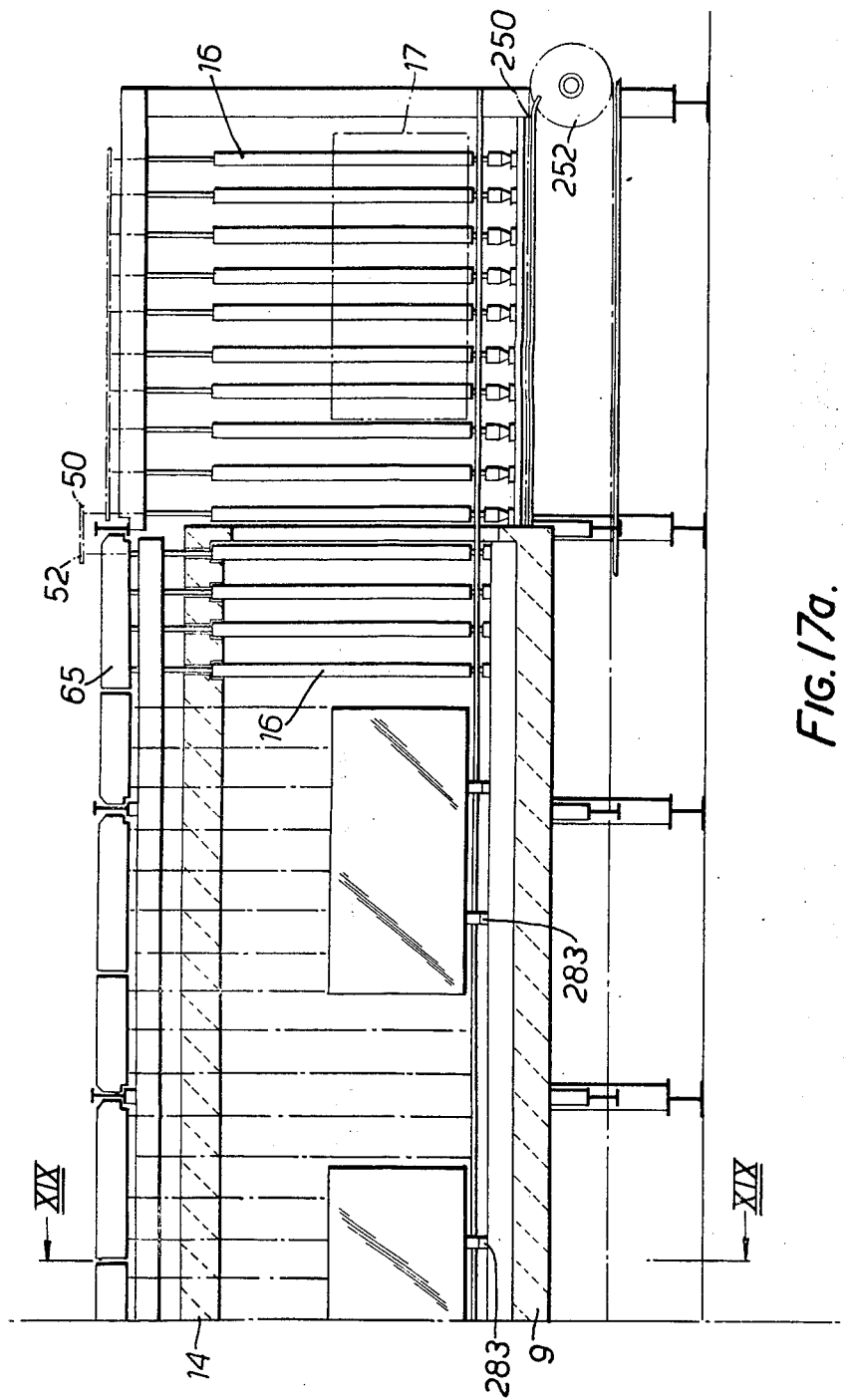

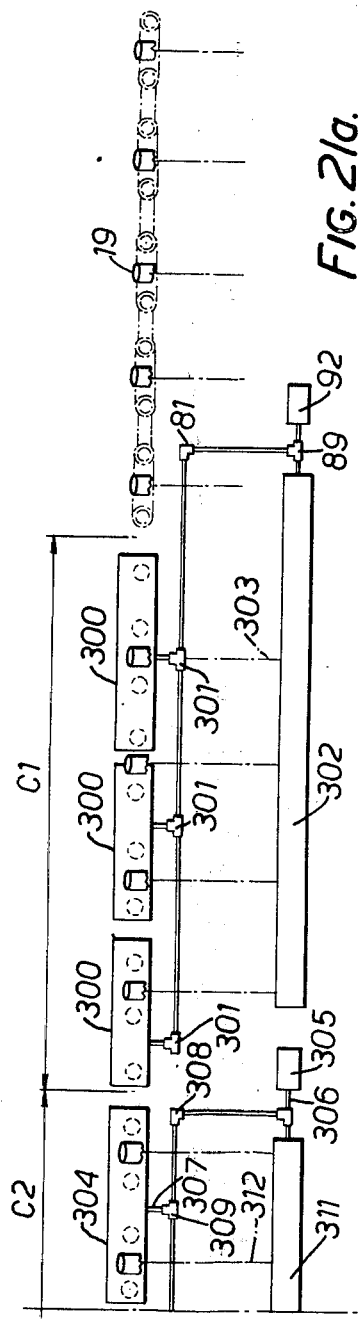
FIG. 2/a.
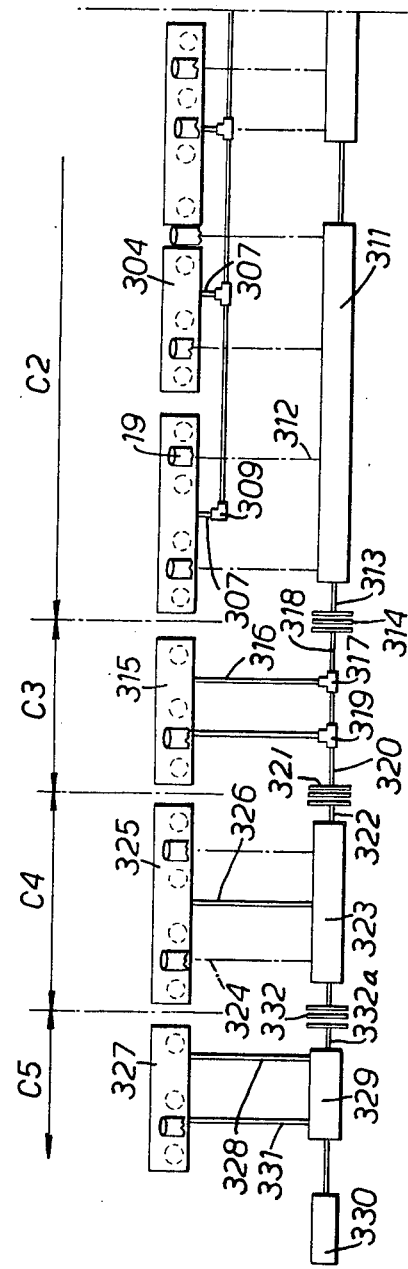
FIG. 2/b.

HEAT TREATMENT OF GLASS SHEETS

BACKGROUND OF THE INVENTION

1. Field of the Invention

This invention relates to the heat treatment of glass sheets while they are supported in an upright disposition. For example the invention relates to the heating of glass sheets for subsequent toughening, bending, or bending and toughening, or prior to annealing or coating of the glass sheets.

2. Background of the Invention

It is usual to suspend glass sheets vertically from tongs and convey the suspended glass through a heating furnace prior to toughening or bending. In another method of heat treating glass sheets which are in an upright disposition cushions of hot gas have been formed on the surfaces of the sheet to support the upright sheet while it is advanced on a conveyor by engagement with the lower edge of the sheet.

Glass sheets have been heated and quenched while conveyed horizontally on a horizontal roller hearth through a furnace in which the glass is heated to a pre-quenching temperature, and then between blowing boxes which direct cold gas, usually air, at the upper and lower surfaces of the glass to toughen the glass.

The pre-quenching temperature to which the glass is heated may be as high as 680°C to 700°C, that is to a temperature just below the softening point of the glass. When at a high temperature just as the glass leaves the furnace it is susceptible to damage by marring of the glass surface by its contact with the rollers, and by sagging of the glass between the rollers due to gravitational forces.

In order to avoid the disadvantages of supporting the glass on horizontal rollers as it is heated and quenched, a gas support system has been developed in which the glass is supported on gas flows while its temperature is such that deformation of the glass is possible. In this system glass sheets are heated and quenched while horizontally disposed on a substantially uniform gaseous support provided by continuously maintaining upward gas flows beneath the sheet at a rate to provide a gaseous cushion beneath the sheet. The glass is moved along a horizontal treatment path while so supported firstly on hot gas which heats the glass to a pre-quenching temperature and then on cold gas which quenches the lower surface of glass at the same time as the upper surface of the glass is quenched by complementary downward flows of cold gas.

In such a system the only mechanical contact with the glass is an edge contact which drives the glass forwardly along a horizontal treatment path. Contact with the surfaces of the sheet is minimal and the support is more uniform than a roller support so that there is less possibility of introducing distortion into the sheet.

Such gaseous support systems are however costly and difficult to regulate since minimal controlling contact with the hot sheets is desirable.

It has now been found that glass sheets can be heated while supported mechanically in an upright position by leaning against a transient mechanical support, for example spaced rollers which are inclined at a small angle to the vertical as long as the support against which the glass leans is advancing at the same forward speed as the glass sheet itself so that no relative slipping takes place between the mechanical support and the glass. Contact of the glass surfaces with the roller surfaces may only be over small areas of the sheet and as the sheet is upright, gravitational loading between the glass surface and the surfaces of the rollers is minimal so that there is a greatly reduced risk of marking of the sheet as compared with that customary with a horizontal roller support. Further since the gravitational load on any part of the sheet, particularly when it is approaching its softening point, is kept to a minimum, there is less risk of sagging of the sheet and any sagging of the sheet between adjacent rollers is picked up by the next roller.

It is a main object of the present invention to provide a method and apparatus for heat treating glass while it is supported in an upright disposition by leaning at a small angle to the vertical against mechanical supporting means.

SUMMARY

The invention provides a method of and apparatus for heating a glass sheet in which a glass sheet is supported in an upright disposition on its lower edge, and is advanced while so supported along a horizontally disposed path through a heating furnace. Transient support is provided for the upper edge of the advancing sheet, which transient support is positioned to cause the sheet to lean at a near-vertical angle, and thermal conditions in the heating furnace and the time the sheet is within the heating furnace are set in dependence on the glass thickness so as to achieve a predetermined temperature condition of the glass sheet, the thermal and time settings being such as to permit the supported glass to relax as it is heated only by an amount less than the maximum acceptable deformation of the sheet.

Glass which has been heat treated in this way can pass immediately between blowing frames to quench the glass and produce toughening stresses in the glass. Alternatively and advantageously the glass can be heated to a predetermined temperature condition for bending while it is traversing the heating zone and then advanced between bending dies which are inclined to the vertical at the same angle as the angle at which the glass is conveyed through the furnace. The bending dies are closed on to the glass and are caused to tilt to a vertical disposition and when opened the released glass is lowered into a bath of chilling liquid to quench and thereby toughen the glass. This bending and liquid quenching method is the subject of co-pending application Ser. No. 450,459 for "Bending Glass Sheets" filed Mar. 12, 1974, the disclosure of which is hereby incorporated by reference; and the present invention provides a method and apparatus for heating the glass for presentation to the bending dies of that co-pending application.

The present invention thus provides an advantageous heating method for presenting a hot glass sheet in a near-vertical disposition for bending and subsequently lowering vertically into a bath of chilling liquid where the glass is toughened.

Preferably the transient support is provided by leaning the upper edge of the glass sheet against spaced apart, near-vertical support rollers, with the lower edge of the sheet offset from the effective support plane of the roller surfaces and the sheet at a small angle to that plane, and driving those rollers at a rate such that their linear surface speed is the same as the speed of advance of the glass sheet transiently supported by the rollers.

It has been found preferable to advance the supported sheet rapidly into the heating zone and to advance the sheet through that zone at a slower speed when the trailing edge of the sheet has entered the zone, and at the end of a time period set for heating the sheet to a predetermined temperature accelerating the supported sheet out of the heating zone.

In this way the sheet is removed from the heating ambience soon after it has reached the required temperature and it is not held in the heating ambience for a time which would produce undesirable relaxation of the sheet against its support such as might produce deformation of the sheet beyond the maximum acceptable deformation.

The invention may be employed for heating a glass sheet to toughening temperature and from this aspect the invention comprises heating a glass sheet of soda-lime-silica composition in the heating zone to a temperature in the range 580°C to 680°C, and transporting the hot sheet from the heating zone to a quenching zone where the hot sheet is quenched to toughen the glass.

The glass may be toughened by directing flows of cooling gas against the glass surface.

If the sheet is to be bent without being toughened it may be heated to a lower temperature and from this aspect the invention provides heating the glass sheet in the heating zone to a temperature in the range 580°C to 610°C, and conveying the hot sheet from the heating zone to a bending zone where the sheet is bent to a predetermined curvature.

The apparatus of the invention for heating glass sheets, for example for bending and/or toughening, comprises a heating furnace through which glass sheets are to be conveyed in upright disposition; a conveyor for the sheets extending through the furnace and including a movable support for the lower edge of a sheet, a plurality of spaced-apart near-vertical rollers defining an inclined support extending through the furnace against which a sheet can relax as it is heated; and driving means for advancing the movable support through the furnace and for driving said near-vertical rollers at a linear surface speed the same as that of the movable support.

Provision is made for aligning all the near-vertical rollers at a predetermined angle to the vertical, for example an angle of 5°.

In one embodiment of the invention the conveyor includes bottom stub rollers defining a track for the movable support, which bottom rollers project through spaces between the near-vertical rollers and are mounted at an acute angle thereto. The movable support is preferably a carriage having faces at an angle matching the acute angle between the rollers to engage frictionally both the bottom rollers and the near-vertical rollers, and the driving means is connected to the bottom rollers to rotate each of the bottom rollers at the same speed as an adjacent near-vertical roller.

The furnace is preferably an electrically heated furnace which includes banks of electrical heaters facing opposite sides of the path of travel of glass sheets through the furnace, which heaters are connected together in groups, and a temperature sensor associated with each group which temperature sensor is connected to a regulating circuit for regulating the supply of electric current to that group of heaters.

BRIEF DESCRIPTION OF THE DRAWINGS

Some embodiments of the invention will now be described, by way of example, with reference to the drawings in which:

FIG. 5 is a section on line V—V of FIG. 2a;

FIG. 7 is a detailed illustration, partly in section, of an adjustable mounting for the bottom bearings of the upright rollers in the furnace;

FIG. 8 is a schematic plan view of the drive for the upright rollers and the bottom rollers;

FIG. 9 is a detailed illustration of an adjustable mounting for bottom rollers in the furnace;

FIG. 10 is a front elevation of a movable carriage on which a glass sheet is supported for transporting through the furnace;

FIG. 14 illustrates in a similar manner to FIG. 11 an arrangement of electrical heaters on the opposite side wall of the furnace;

FIGS. 17a and 17b are views similar to FIGS. 2a and 2b of another embodiment of apparatus according to the invention in which glass sheets are supported on endless chains during their travel through the furnace;

FIGS. 21a and 21b illustrate schematically a modified form of the apparatus of FIGS. 1 to 16 in which several sheets can be present in different parts of the apparatus.

DESCRIPTION OF THE PREFERRED EMBODIMENTS

Figure 1:
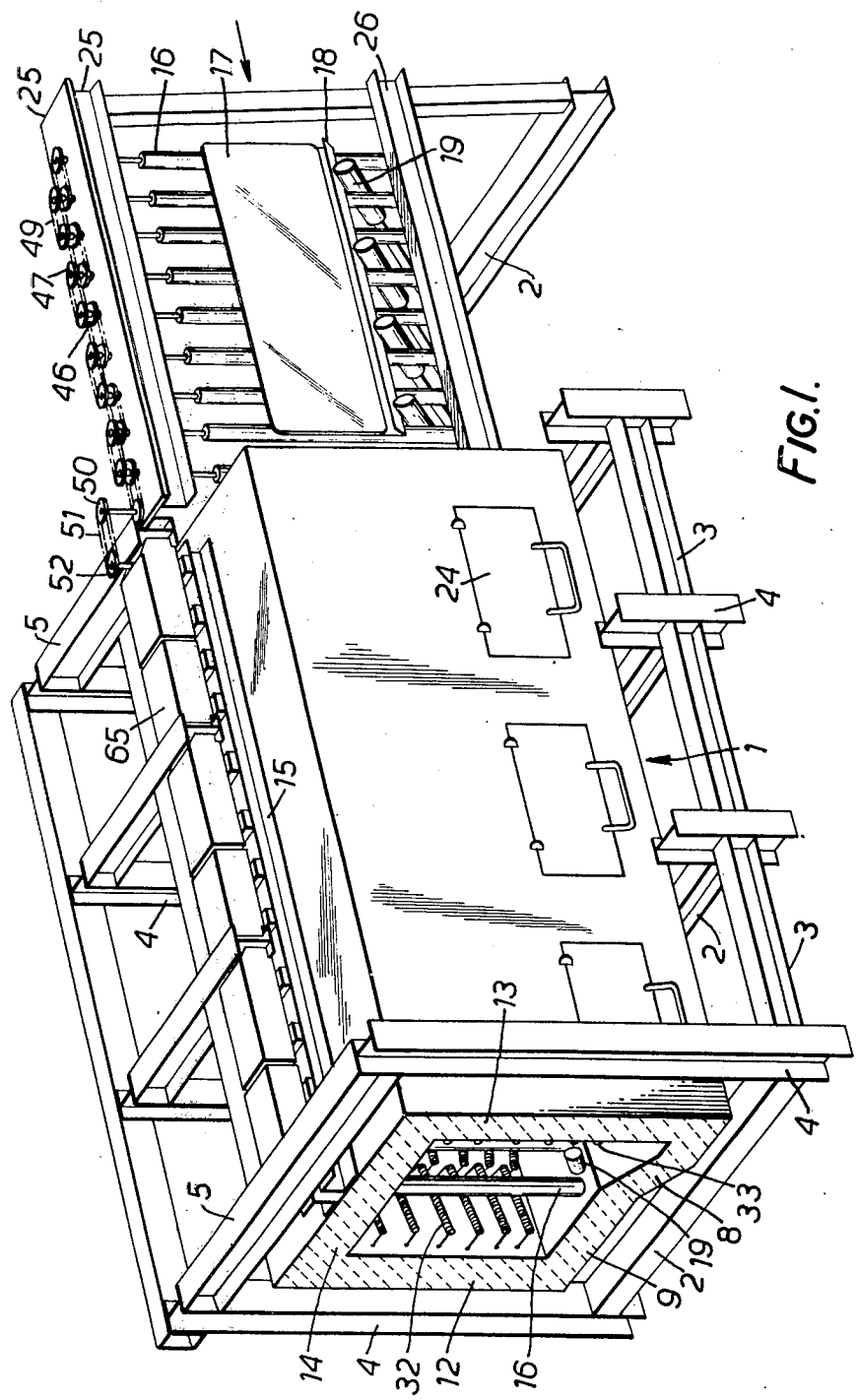
FIG. 1 is a general perspective view, partly in section of a furnace according to the invention for heating glass sheets, and showing a loading station for the glass sheets.

Referring to FIGS. 1 to 5 of the drawings, FIG. 1 is a general view illustrating apparatus according to the invention for heating glass sheets which are conveyed through the apparatus in an upright disposition. The furnace chamber is indicated at 1 and is of generally rectangular form in cross-section with a specially shaped floor as will be described and is supported at an angle to the vertical of about 5° in a basic girder framework which includes base girders 2 which are joined at their ends by cross-girders 3. From the ends of the base girders 2 there extend upright girders 4 which are at an angle of 5° to the vertical as more clearly shown in FIGS. 4 and 5. The upper ends of the girders 4 are connected together by cross-girders 5 which are inclined at an angle of about 5° below the horizontal.

The floor of the furnace is supported by cross-girders 6 which extend between the lower ends of the upright girders 4 and are shaped with a downwardly sloping step 7 near one end supporting a downwardly sloping part 8 of the floor 9 of the furnace.

Each of the upright girders 4 has a foot-plate 10 which is bolted by bolts 11 to the upper horizontal web of the appropriate one of the base girders 2. The girders 5 and 6 are also connected to the upright girders 4 in similar manner.

Figure 2A:
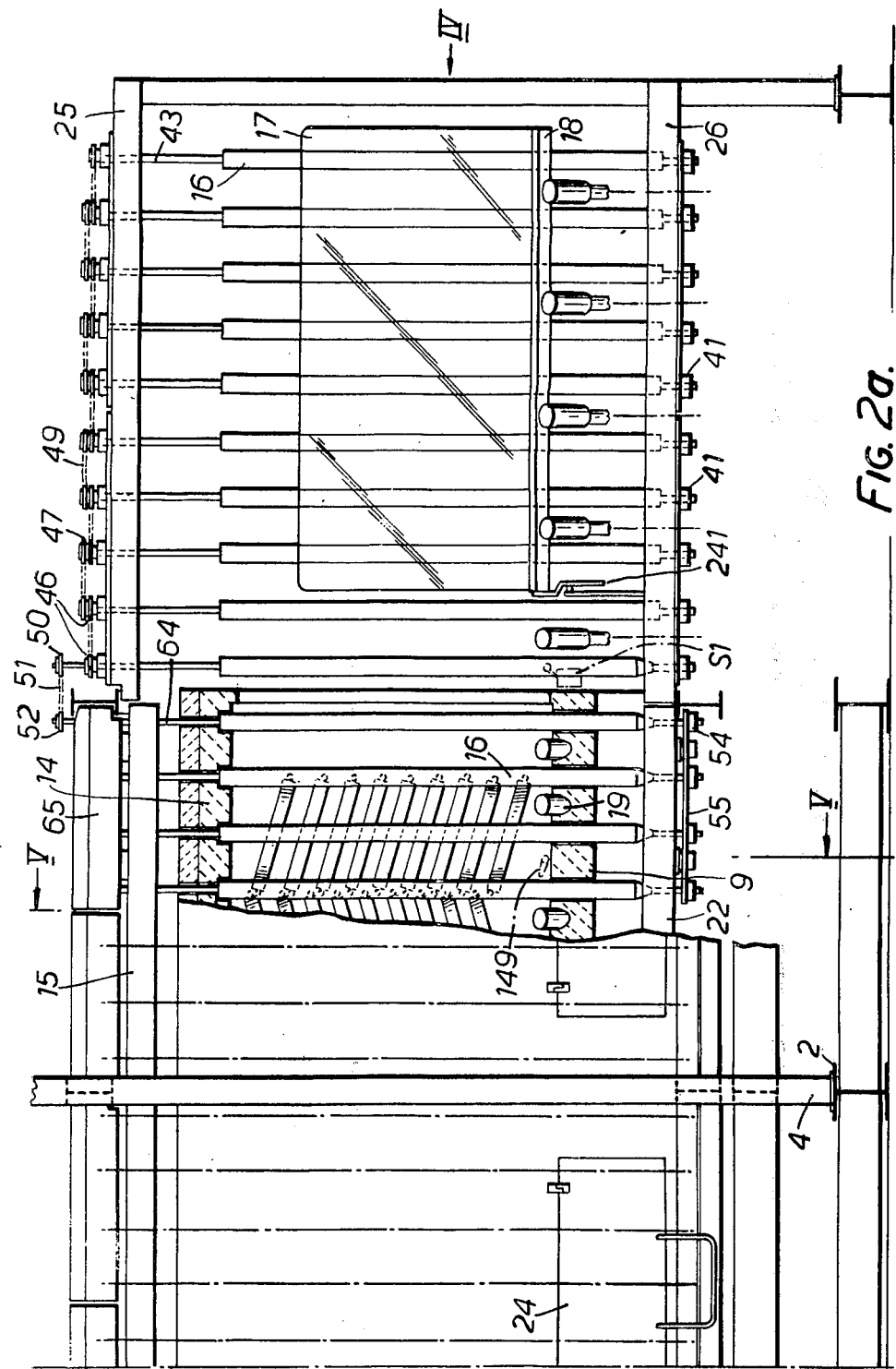
FIGS. 2a and 2b together represent a side elevation of the furnace and loading station of FIG. 1, and an unloading station partly broken away to illustrate upright, near-vertical support rollers and associated bottom rollers at the loading station and in the furnace.
Figure 2B:
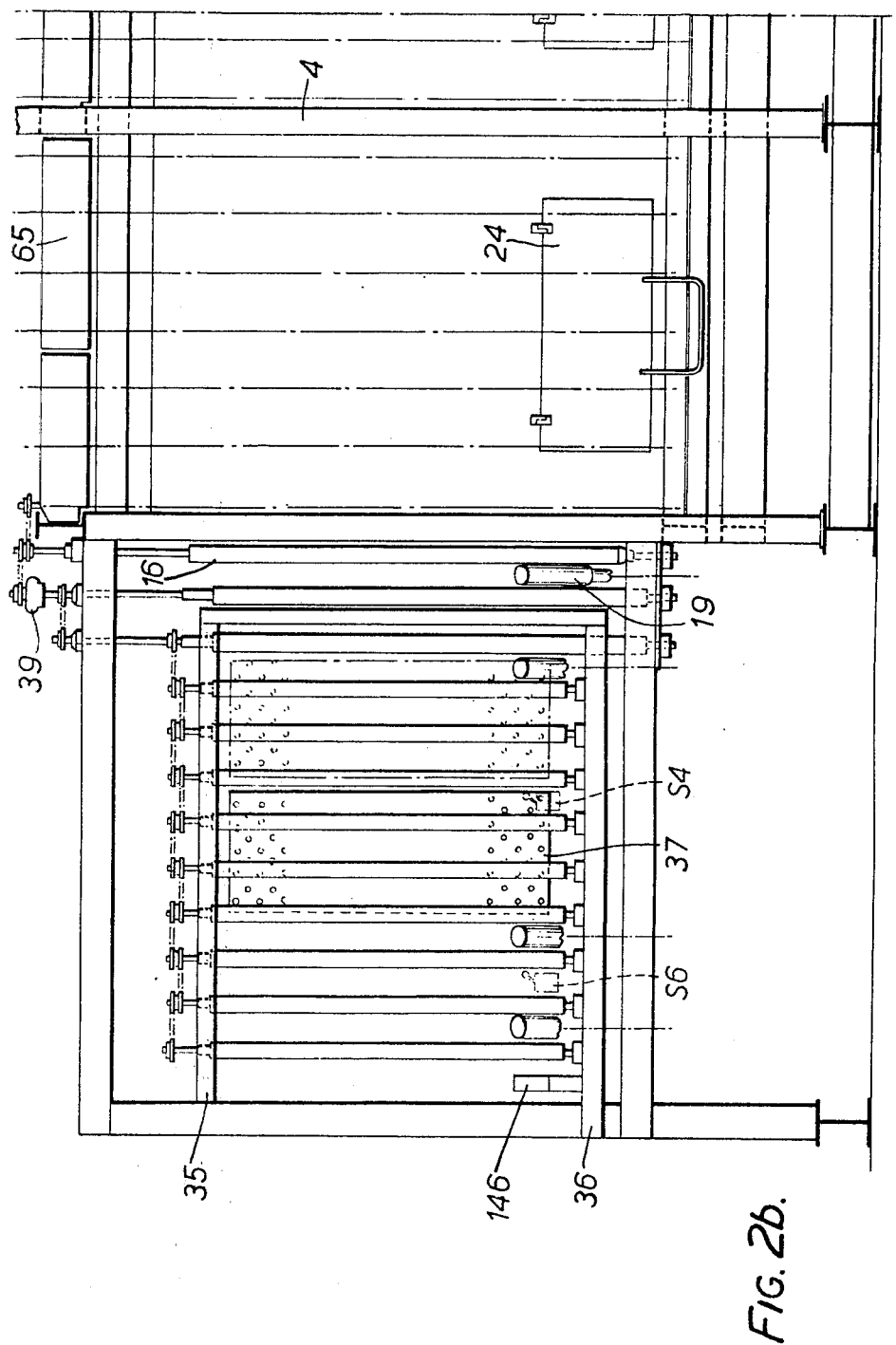

The furnace 1 is a refractory lined metal structure having two side walls 12 and 13 which extend upwardly from the floor 9, and an integral roof construction 14 which is fixed to longitudinal girders 15 which are fixed below the cross-girders 5 and provide means for suspending the roof 14 of the furnace as well as providing support for the upper ends of a plurality of spaced-apart upright, near-vertical rollers 16 which define an inclined support for sheets of glass 17 to be conveyed through the furnace. The rollers 16 are each mounted at an angle of from 2° to 10° to the vertical, e.g. 5°, and form part of a conveyor for the sheets 17 which extends right through the furnace from the loading station and is continued at the outlet end of the furnace as illustrated in FIGS. 2a and 2b. The rollers 16 are of heat-resistant stainless steel, or may be asbestos covered, and are 6.5 cm in diameter and are spaced 19 cm apart in the furnace. The spacing between rollers may be up to 30 cm in the region of the outlet end of the furnace where the glass reaches into final temperature. At the inlet end of the furnace where the glass is at a low temperature, the spacing may be greater, for example 38 cm or more providing there are sufficient rollers to support the whole length of the glass sheet in a stable condition.

The conveyor includes a movable support in the form of a carriage 18 on which the lower edge of the glass sheet is seated and driving means for advancing the carriage through the furnace while the glass supported on the carriage leans against the upright rollers 16. As will be described driving means for the rollers 16 is arranged to rotate each of those rollers at the same linear surface speed as the movable carriage.

Figure 4:
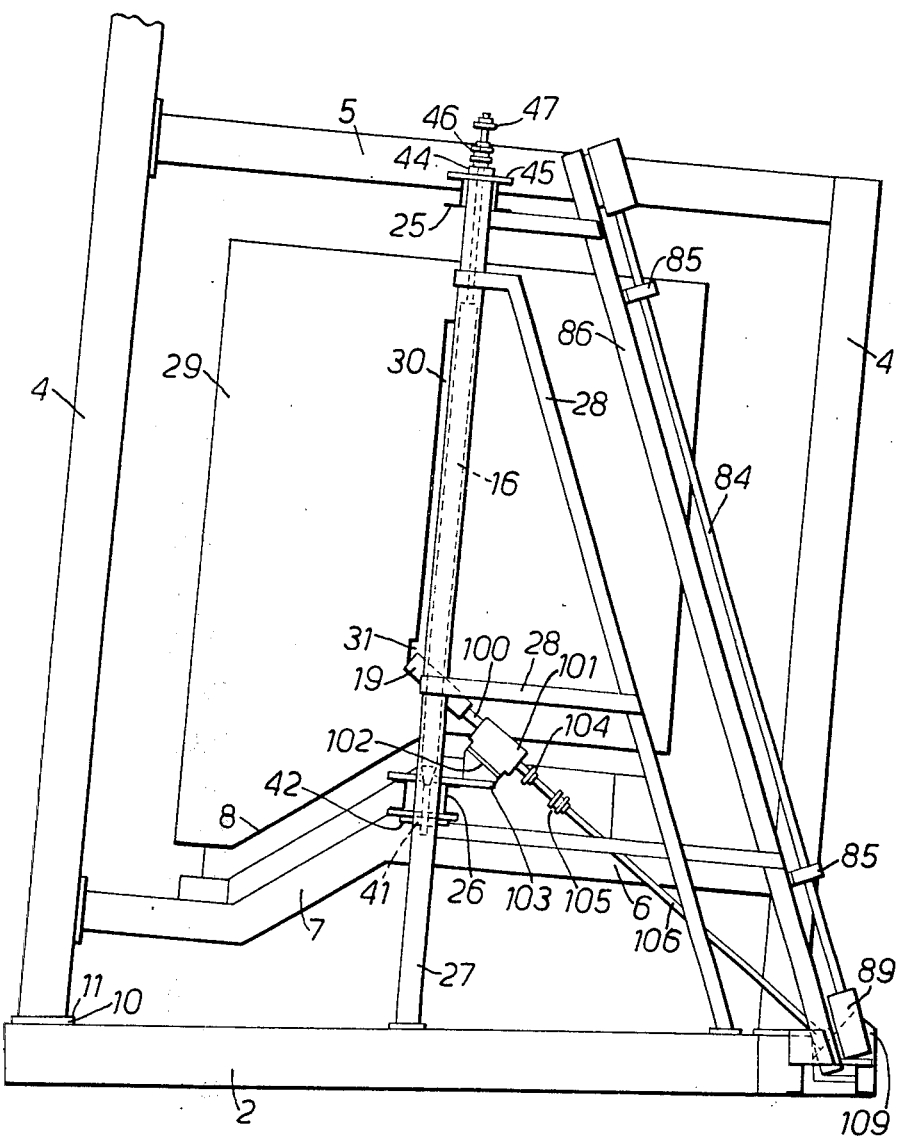
FIG. 4 is an end elevation of the furnace of FIG. 1 as viewed in the direction of arrow IV of FIG. 2b.
Figure 5:
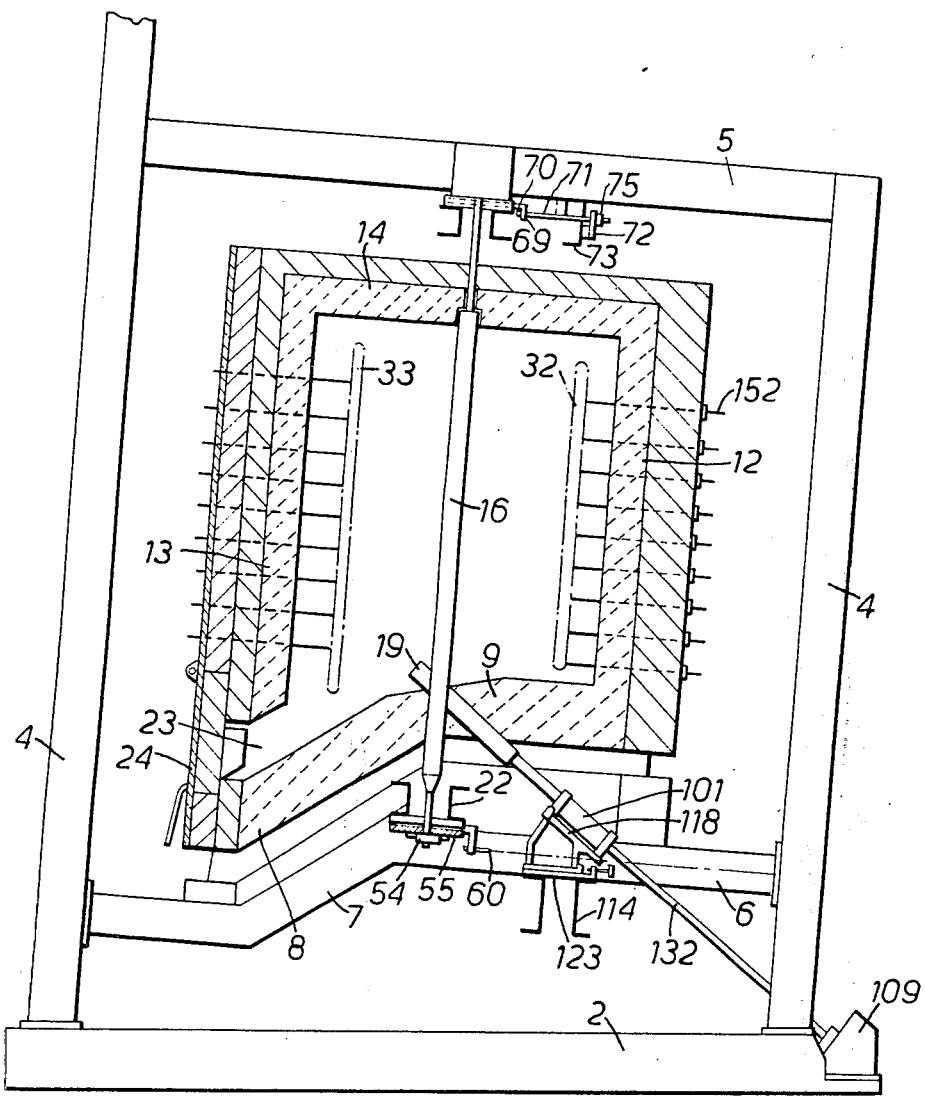
Figure 11:
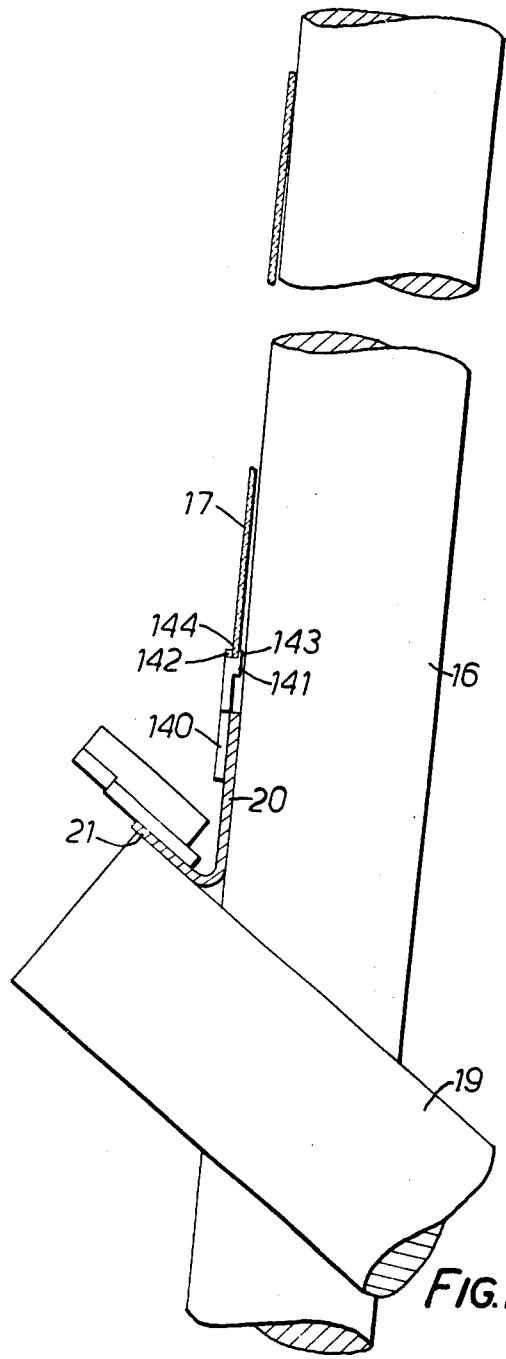
FIG. 11 is a section on line XI—XI of FIG. 10 also indicating the disposition of the carriage and the glass sheet relative to the rollers.

The conveyor also includes bottom stub rollers 19, also of heat-resistant stainless steel or asbestos covered, which project through the spaces between the upright rollers 16 and are mounted at an acute angle to the upright rollers for example an angle of about 50° as illustrated in FIGS. 4 and 5. The carriage 18 is of V-section which, as illustrated in FIGS. 10 and 11 has faces 20 and 21 which are at an angle to each other matching the acute angle between the upright rollers and the stub rollers. The faces 20 and 21 of the carriage engage frictionally both bottom stub rollers and the upright rollers. Driving means to be described is connected to the bottom rollers to rotate each of those bottom rollers 19 at the same linear surface speed as an adjacent upright roller so that the carriage is advanced through the agency of its frictional engagement with both the bottom rollers 19 and with the upright rollers 16. The carriage carrying the sheet of glass 17 is thereby advanced through the heating zone within the furnace with the lower edge of the sheet seated on specially shaped supports on the upper edge of the face 20 of the carriage and with the upper edge of the sheet 17 initially engaging the upright rollers 16.

Figure 5A:
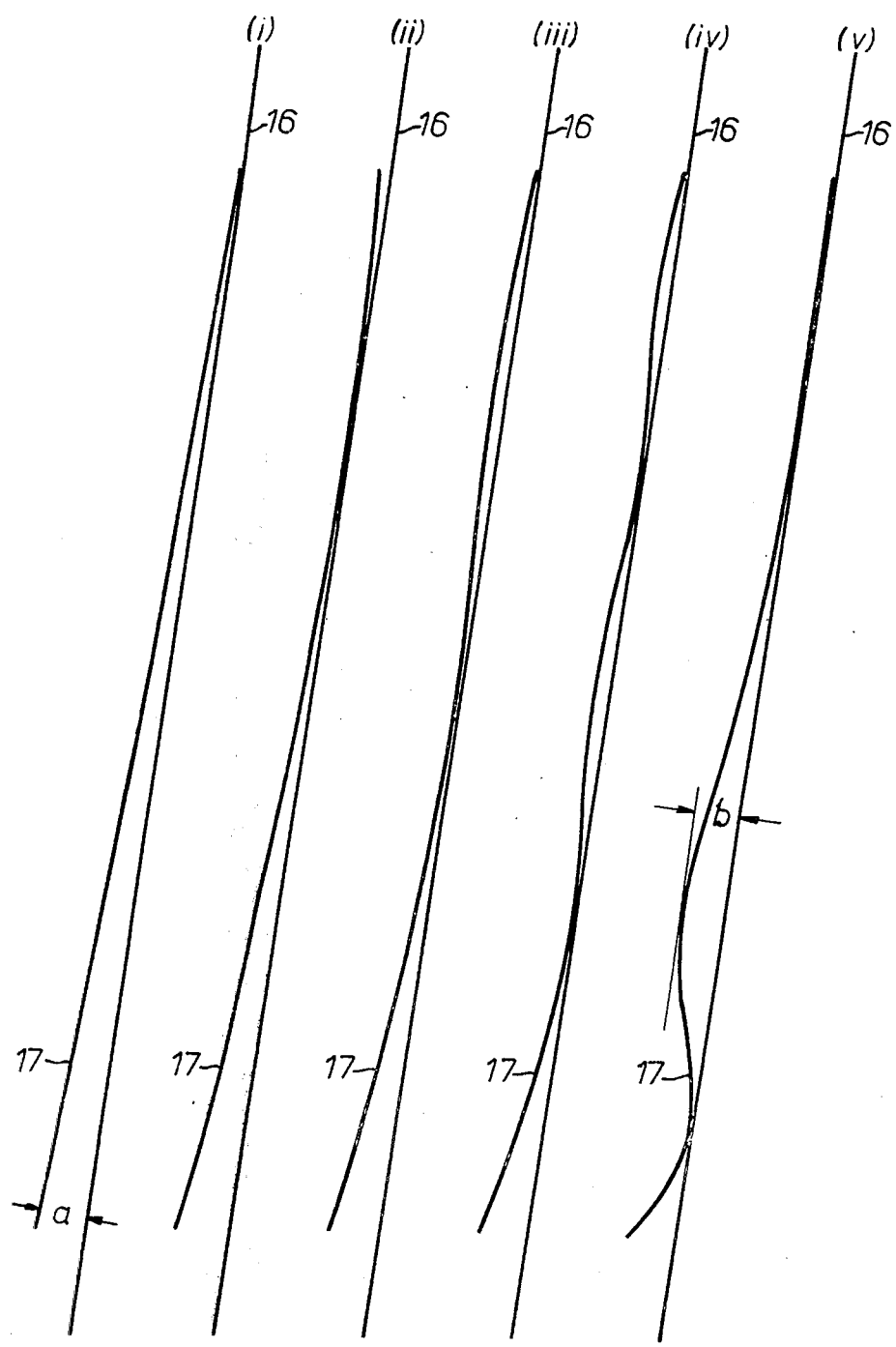
FIG. 5a shows diagramatically stages in the relaxation of a flat glass sheet against the near-vertical support rollers as the sheet is heated.

Five stages of relaxation of the glass sheet 17 against the upright rollers 16 are illustrated in FIG. 5a. In each of the diagrams of FIG. 5a the line 16 represents the effective support plane defined by the surfaces of the upright rollers 16 and the line 17 represents the glass sheet. The offset $a$ of the lower edge of the glass sheet from the rollers surfaces is indicated in diagram (i).

Initially only the top edge of the flat glass sheet contacts the rollers 16. As the glass softens the sheet begins to sag under its own weight and begins to touch the rollers below the top edge of the sheet as indicated in diagram (i).

The sagging of the glass continues causing the point of contact with the rollers to move downwards as indicated in diagram (ii) and the top of the sheet lifts away from the roller surfaces.

Diagram (iii) illustrates how as heating of the glass continues during the continued travel of the sheet through the furnace, the point of contact of one face of the sheet with the rollers continues to move downwardly and the top of the sheet falls back on to the rollers to form a shallow arch which is exaggerated in the diagram.

Then the portion of the glass sheet below the lower point of contact of the glass with the rollers continues to sag under its own weight and due to the compressive effect of the glass above it, and the arch which developed at the heating stage illustrated in diagram (iii) lengthens until it eventually collapses under its own weight against the rollers to give a second region of contact with the rollers as indicated in diagram (iv).

Study of the continued behaviour of the sheet which is now approaching the required temerature for bending and/or toughening shows that several such shallow arches may form and collapse in the upper portion of the supported sheet, but the lowest arch is the most persistant as it is under the greatest compression. All the very shallow upper arches tend to collapse against the rollers so that the upper portion of the sheet becomes virtually flat against the rollers as shown in diagram (v), and a persistant bulge develops in the lower portion of the sheet.

The extent of this bulge, represented by a dimension $b$ measured from the effective support plane of the rollers 16, gives a measure of the deformation of the sheet in the course of its heating, and the thermal and time settings of the heating schedule are controlled, as will be described, to permit the supported glass sheet to relax as it is heated only by an amount less than the maximum acceptable deformation $b$ of the sheet.

For most purposes, and particularly in the manufacture of automobile windscreens the maximum acceptable value of deformation b is 0.5 mm.

In the preferred way of operating the heating zone is set at a particular temperature, and the time taken for the glass sheet to traverse the heating zone is set in dependence on the glass thickness so as to achieve a predetermined temperature condition.

The temperature of the heating zone must be such that in the time taken for the glass sheet to reach the predetermined temperature condition, and depending on the thickness and height of the glass sheet, the angle of the supported sheet as governed by the angle of the rollers 16, and the amount of offset on the lower edge of the glass sheet from the rollers 16, the glass sheet is only permitted to relax by an amount less than the predetermined maximum acceptable deformation of the glass sheet which is the amount of deformation which is acceptable in meeting particular product quality requirements. When quality requirements are very stringent, the maximum acceptable deformation may occur for example during the initial relaxation of the glass sheet against the rollers as in diagram (iii) before appearance of the lower bulge.

By determination of the variation of temperature with time of the glass sheet 17 as it is carried through the furnace, and knowing the variation of viscosity with temperature of the glass from which the sheet is made, a quantity to be called the "deformation index" can be calculated for the glass sheet at any time during the heating of the sheet and when the sheet reaches a predetermined temperature condition.

The deformation index is represented by the expression:

$$\int \frac{dt}{\eta(t)}$$

where:
$t$ = heating time in seconds
$\eta(t)$ = viscosity of the glass in poises at time $t$ after commencement of heating.

The deformation index is therefore represented by the integrated area under the curve of the reciprocal of the viscosity plotted against time. The value of the deformation index of the glass sheet is zero as the sheet enters the furnace and heating begins and this value increases with time at a rate which depends on the rate of change of viscosity of the glass and hence on its rate of heating. The deformation index rises until a critical value is reached at which time deformation of the sheet has reached a maximum acceptable value. The value of the critical deformation index will depend therefore on the use to which the glass sheet is to be put.

In practice the heating schedule is such as to ensure that the actual deformation index of the sheet when it attains a desired temperature condition is less than the critical deformation index.

In the idealised case in which the glass sheet has continuous support along its bottom edge the critical value of deformation index can be represented by the expression.

$$S = \frac{T^2 A}{\rho g L^2 Y}$$

where
$S$ = a scale factor
$T$ = thickness of glass (cm)
$A$ = angle of support to vertical
$\rho$ = density of glass sheet (2.5 g/cm$^3$)
$g$ = gravitational acceleration (981 cm/sec$^2$)
$L$ = height of glass sheet (cm)
$Y$ = offset of bottom edge of glass sheet from the support (cm).

For a glass sheet of a particular thickness and height and with set furnace parameters, particularly the angle of the rollers and the offset of the lower edge of the glass sheet from the rollers and hence the angle of the glass sheet to the vertical, the scale factor can be calculated for an idealised case with continuous bottom edge support for the glass sheet and for the relaxation condition in which a bulge is appearing in the glass sheet.

Figure 6:
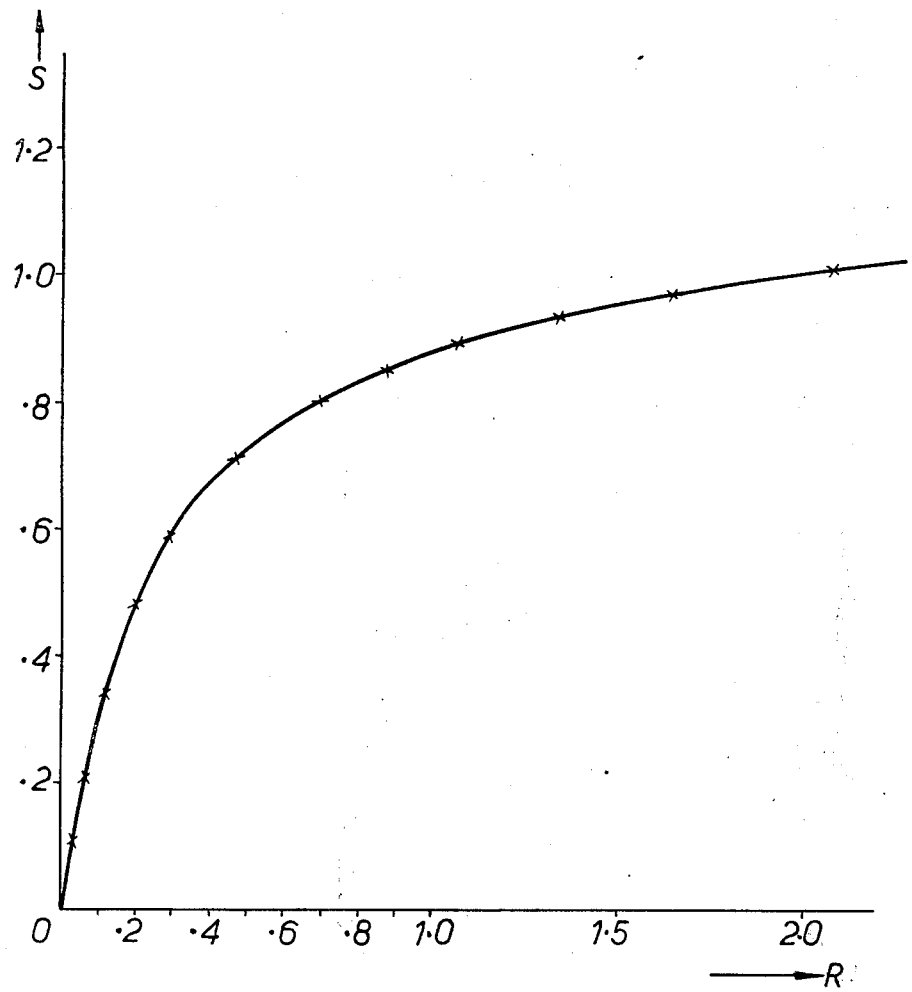
FIG. 6 is a graph illustrating selection of a scale factor for calculations concerning permissible deformation of a glass sheet as it is heated in the furnace.

The curve of FIG. 6 is a graph of the scale factor $S$ against the ratio of acceptable amount of bulge of the glass sheet to the offset of the lower edge of the sheet from the rollers, which ratio is designated R. The amount of bulge is measured as the displacement at the maximum point of bulging from the effective support plane of the rollers 16.

In the actual case in which the lower edge of the glass sheet is seated on spaced supports on the carriage so that the bottom edge support of the glass sheet is discontinuous, the scale factor $S$ is less than the above mentioned idealised value so that the critical value of deformation index, which is empirically determined, will be less than given by the above idealised formula.

To obtain the critical deformation index which will apply for any set of operating conditions a glass sheet of particular thickness and height is heated under experimentally verified process conditions of roller angle, offset of the lower edge of the glass sheet from the rollers, and furnace temperature setting. The glass sheet is heated under these conditions until a maximum acceptable amount of distortion of the glass is present which may be reached during the initial relaxation of the upper part of the glass sheet against the rollers, but which is more usually a limiting amount of bulging which is acceptable during continued relaxation of the glass sheet.

The temperature/time heating schedule of the glass sheet is also determined experimentally, which permits calculation of the actual deformation index of the glass when the glass sheet has the maximum acceptable deformation, which actual deformation index is the critical deformation index.

The critical deformation index is a function of the parameters $T$, $A$, $L$ and $Y$ in the above formula, and the determination of the critical deformation index for a particular glass sheet under particular furnace conditions permits calculation of the critical deformation index for other thicknesses and heights of glass sheets and for other values of roller angle, and offset of the lower edge of the glass sheet from the rollers.

Usually the offset distance is about 2 mm to 4 mm and the maximum acceptable amount of deformation depends on the quality, particularly the optical quality required in the final product. In the case of glass sheets which are to be incorporated in vehicle windscreens, for which the optical requirements are stringent, it may only be acceptable to permit deformation of the glass sheets up to a point in the initial relaxation before the appearance of the bulge. A bulge of up to 0.5 mm may be acceptable.

Where the quality requirements are less critical a bulge greater than 0.5 mm may be permissible, for example up to 4.0 mm.

Having determined the critical deformation index for a glass sheet of particular height and thickness, the time required to heat the glass sheet to a desired final temperature using a particular furnace temperature setting can be determined and set, so that the glass sheet will not relax beyond the maximum acceptable amount of distortion since the actual deformation index of the glass sheet when it reaches its desired final temperature will be less than the critical deformation index.

It has been found that the near-vertical angle at which the sheet is initially supported when leaning against the rollers 16 may be in the range 2° to 10° for the heating of sheets of soda-lime-silica glass of thickness in the range 1.5 mm to 15 mm to a temperature in the range 580°C to 680°C or even 700°C which temperature range encompasses the usual temperature to which soda-lime-silica glass is heated prior to bending or toughening.

The upright, near-vertical rollers 16 are supported at their lower ends by self-aligning bearing blocks, described hereafter, which are carried by parallel girders 22 which run beneath the furnace floor and are supported on the specially shaped cross-girders 6 which support the furnace floor 9. The downwardly sloping step 8 in the furnace floor which slopes towards the bottom of the side wall 13 permits any cullet which falls to the floor, if a glass sheet breaks during heating or falls from the support rollers, to be collected at outlets 23 near the bottom of the side walls 13 which outlets are closed by hinged doors 24. This arrangement permits the floor of the furnace to be kept clear without losing too much heat from the furnace.

The first ten rollers 16 of the plurality of upright rollers constitute a loading station as illustrated at the right-hand side of FIG. 2a. These rollers are mounted between upper horizontal girders 25 which form an extension of the girders 15 and lower horizontal girders 26 which form an extension of the roller supporting girders 22. The girders 25 and 26 at the loading station are connected to an end frame comprising a base girder 2 and an upright 27 which is inclined to the vertical at the same angle of abouot 5° as the rollers 16 and which is supported by struts 28 as illustrated in FIG. 4.

The end wall of the furnace at the loading station is indicated at 29 in FIG. 4 and an entrance mouth 30 to the furnace is formed through the end wall 29 in alignment with the upright rollers 16 and includes an enlargement 31 at the bottom of the mouth 30 and aligned with the stub rollers 19 to permit the passage of the carriage 18 on the conveyor into the furnace. Flexible asbestos cloth sealing strips, not shown, are mounted in the mouth 30.

The side walls 12 and 13 of the furnace carry banks of electrical heaters indicated generally at 32 and 33 in FIG. 1. These heaters face opposite sides of the path of travel of the glass sheet through the furnace and are connected together in groups which are individually controlled as will be described with reference to FIGS. 13 and 14. The speed at which the glass sheet traverses the furnace is adjustable and is set so that as soon as the glass has been heated to a substantially uniform temperature for further processing, its carriage and the rollers against which it bears are accelerated to accelerate the glass sheet out of the furnace on to a continuation of the conveyor comprising further upright rollers 16 at the same angle to the vertical and bottom stub rollers 19 which are mounted between upper and lower support beams 35 and 36 at a glass treatment station for example adjacent the outlet end of the furnace at which blowing frames are disposed as indicated at 37 to direct chilling air through the interspaces between the rollers 16 on to one side of the sheet and directly at the exposed opposite side of the sheet to toughen the glass as it passes on the conveyor to an unloading station forming a still further extension of the conveyor at the same angle to the vertical and driven through a clutch 39.

Alternatively the upper edge of the hot glass sheet may be engaged by tongs and the sheet lifted from the conveyor and carried to an air quenching station, or lowered into a tank of chilling liquid where the sheet is quenched. The conveyor continuation at the outlet end of the furnace might then be enclosed in a heated closure from which the hot glass sheet is raised or lowered as appropriate.

At the loading station illustrated at the righthand of FIGS. 1 and 2a the glass 17 loaded on to the carriage 18 and leaning against the upright rollers 16 is cold and is not therefore subject to deformation and the necessity for exact alignment of the rollers 16 is not as critical as in the furnace where the glass is being heated. Therefore the rollers 16 which are mounted between the beams 25 and 26 at the loading station are not angularly adjustable but are mounted in fixed bearing blocks so as to be at the angle of the conveyor, for example the angle of 5°.

Figure 3:
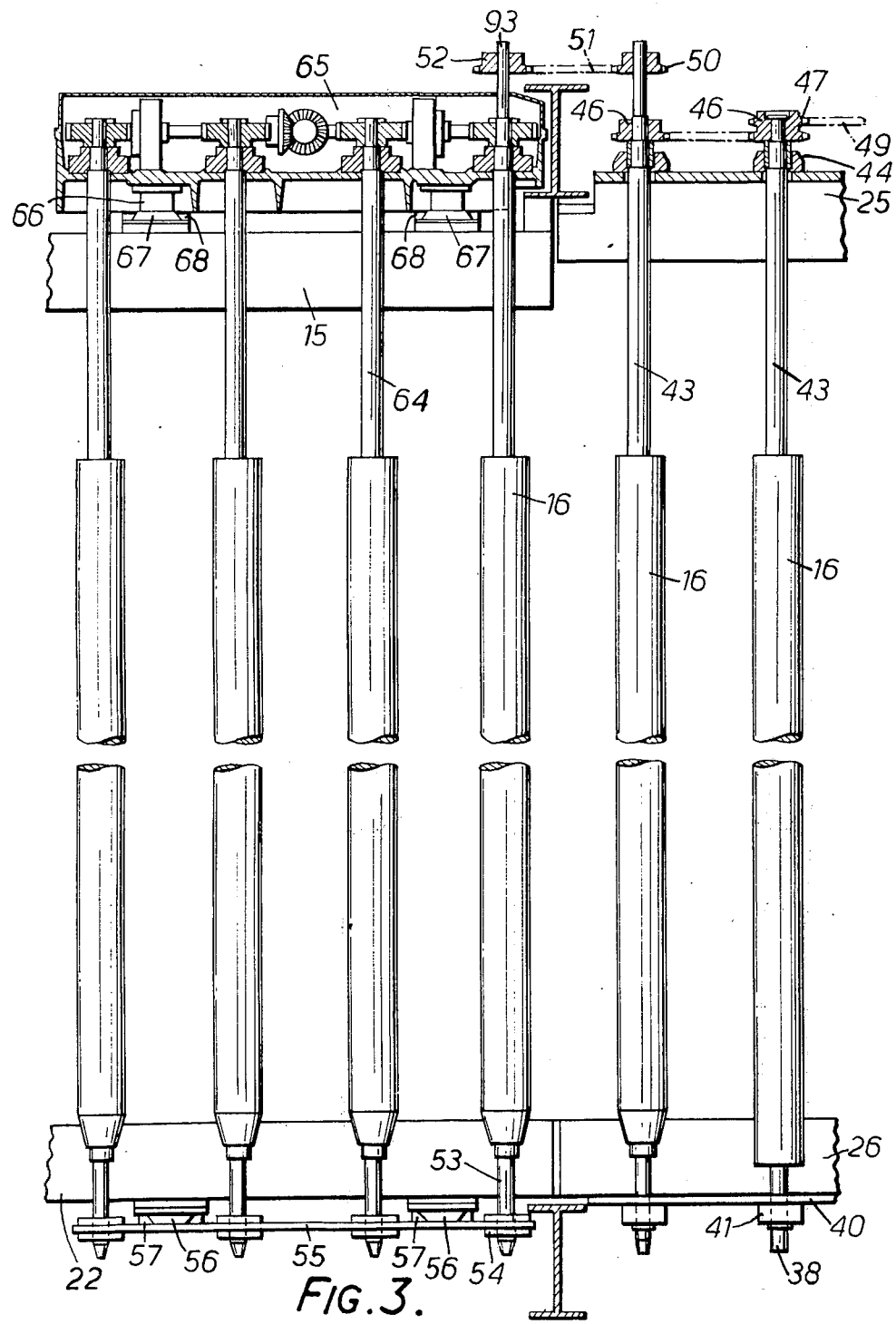
FIG. 3 is a detailed elevation showing the mounting of the upright support rollers.

As shown in FIG. 3 the lower ends of the rollers 16 at the load station are formed with stub shafts 38 which extend downwardly between the girders 26 and through apertures in a plate 40 which is bolted to the bottom of the girders 26. Beneath the plate 40 there are carried self-aligning bearing blocks 41, one for each of the rollers 16. The bearing blocks 41 have lugs 42 which are bolted to the plate 40 and the stub shafts 38 extend downwardly into and through the bearing blocks 41.

At their upper ends, the upright rollers 16 at the loading station are formed as integral elongated stub shafts 43 which extend upwardly between the beams 25 and are each housed in a self-aligning bearing block 44. The bearing blocks 44 are bolted by lugs to a support plate 45 which are fixed on top of the girders 25.

Each shaft 43, except that of the roller 16 nearest to the furnace entrance, extends upwardly through the bearing block 44 and carries a sprocket wheel block comprising two sprocket wheels 46 and 47. The sprocket wheels for adjacent rollers are connected together by means of drive chains 49. The elongated stub shaft 43 of the roller 16 of the loading station nearest to the inlet end wall 29 of the furnace is longer than the stub shafts 43 of the other rollers of the loading station and, carries a single sprocket wheel 46 and on its upper end a main drive sprocket 50 which is connected by a driving chain 51 to a sprocket 52 on the upper end of the first of the upright rollers 16 within the furnace. The rollers 16 at the loading station are thus driven from the same drive as the rollers 16 constituting the rest of the conveyor in the manner which will now be described.

Within the furnace it is important to ensure accurate alignment of the roller surfaces relative to each other so that the surfaces of the rollers which are engaged by the glass sheet all lie in the same plane which is inclined to the vertical at the present angle, for example 5°. In order to effect this the rollers 16 within the furnace are mounted in alternating groups of four and three rollers each, and the lower bearings of each group of adjacent rollers are adjustable at right angles to the direction of advance of the conveyor. The upper ends of the rollers of each group are mounted in a gear box whose position is also adjustable at right angles to the direction of advance of sheets along the conveyor. This permits adjustment of the disposition of the bearing blocks and the gear boxes relative to each other to align all the upright rollers 16 in the furnace at a predetermined angle to the vertical.

The lower end of each roller is formed as a stub shaft 53 which is supported in a self-aligning bearing block 54 which is fixed in a plate 55 which is carried by dove-tail slides 56 which slide in slide beds 57 which are fixed beneath the girders 22. This arrangement is shown in greater detail in FIG. 7. Each of the dove-tail slide blocks 56 has an end lug 58 which is drilled and threaded to receive the threaded end 59 of an adjusting shaft 60 whose other end extends through an apertured locating block 61 which is bolted to a cross-girder 62 extending between the lower ends of the upright girders 4 along one side of the furnace. The outer end of the shaft is threaded and is fitted with lock nuts 63 on either side of the block 61. Each of the plates 55 carrying the bearing blocks 54 for a group of the rollers has two V-slides and adjustment of the two shafts 60 permits adjustment of the disposition of the lower ends of that group of rollers.

The upper ends of the rollers 16 of the group are of reduced diameter and their elongated stub shafts 64, FIGS. 3 and 5 extend into a gear box 65 mounted by anti-vibration mountings 66 on dove-tail slides 67 which are located in slide beds 68 which are mounted on top of the longitudinally extending girders 15. In the same way as the slides for the lower bearings of the rollers each of the dove-tail slides 67 has an end lug 69 which is drilled and threaded to receive the threaded end 70 of an adjustment shaft 71. The other end of the shaft 71 extends through an apertured locating plate 72 which is mounted on a girder 73 which also runs longitudinally of the furnace beneath the cross-girders 5. The outer end of the shaft 71 is threaded and is fitted with lock nuts 75 on either side of the locating plate 72. Each of the gear boxes is seated on two such slides and rotation of the shafts 71 for that gear box moves the V-slide plates 67 in their side beds 68 so that the position of the gear boxes can be adjusted as required relative to the adjustment of the bearing blocks for the lower ends of the rollers to ensure that the upright rollers 16 driven by that gear box are at the required predetermined angle to the vertical.

The upper ends of the elongated stub shafts 64 of the rollers 16 are mounted in the gear box 65 by bearing blocks and are driven by worm gears in conventional manner. The input drive to each of the gear boxes 65 is through a right-angle drive unit 76, FIG. 8, which has a main input drive shaft 77. The drive shaft 77 for the first of the gear boxes 65 is connected through an intermediate shaft 78 and flexible couplings 79 to the main output shaft 80 of a main right-angle drive unit 81 whose input drive is by a shaft 84 which is mounted in bearing blocks 85 which are fixed to an inclined support girder 86, FIG. 3, which extends downwardly from the upper longitudinal girders 25 at the loading station to the base support structure of the apparatus. At its lower end below the lower bearing block 85 the shaft 84 is coupled to the output shaft 88 of a right-angle drive unit 89 whose input shaft 90 is coupled by a flexible coupling 91 to the output shaft of an hydraulic motor 92 which constitutes the main drive unit for the whole apparatus.

The first gear box 65 for the rollers 16 in the furnace has an output shaft 93, FIG. 3, which carries the drive sprocket 52 which transmits drive from that gear box to the drive sprocket 50 of the roller at the loading station adjacent the end wall 29 of the furnace and thereby it drives all the rollers 16 at the loading station at the same speed as the rollers 16 in the furnace. The right angle drive unit 76 which transmits drive from the hydraulic motor to the first gear box 65 has a transmission shaft 94 aligned with the input shaft 77, which transmission shaft 94 is coupled by a flexible coupling 95 to an intermediate shaft 96 which transmits drive through a further flexible coupling 95 to the next right angle drive unit 97 which is connected to the next gear box 65 which drives the next three rollers.

All the gear boxes 65 are coupled together in this way and are all driven at the same speed by the hydraulic motor 92. The position of the gear box 65 for each group of rollers is adjustable in the manner described, in conjunction with adjustment of the plate 55 carrying the bearing blocks for the lower ends of the rollers so that in setting up the furnace all the rollers 16 of the conveyor extending through the furnace can be accurately aligned so that the glass-supporting surface of each of the rollers is at the same angle to the vertical, e.g. 5°.

The bottom stub rollers 19 define a track for the movable carriage 18 which carries the glass sheet through the furnace and these bottom rollers project through spaces between the upright rollers 16 along the whole length of the conveyor and are mounted at an acute angle, in this embodiment 50°, to the upright rollers 16.

The five bottom rollers 19 which support the carriage 18 at the loading station are shorter than those which project inwardly into the furnace, and are located in alternate spaces between the upright rollers 16. At the loading station as shown in FIGS. 4 and 8 each of the rollers 19 is fixed to one end of a shaft 100 which is supported in a cylindrical bearing assembly 101 which is mounted on an inclined base 102 which is carried on a plate 103 bolted to the girders 26. The shafts 100 all extend downwardly towards the base of the furnace and the shaft 100 of the stub roller 19 nearest to the inlet end wall 29 of the furnace which extends through its cylindrical bearing assembly 101 carries a sprocket wheel 104 and is connected by a flexible coupling 105 to an intermediate shaft 106 which is connected by a further flexible coupling 107 to a transmission shaft 108 which extends from a gear box 109 which is mounted at the base of the apparatus and which has an input shaft 110 connected through a flexible coupling 111 to an output from the right angle drive unit 89 which is driven directly by the main hydraulic motor 92.

The rest of the stub rollers 19 at the loading station are driven from the roller 19 just described nearest to the inlet to the furnace. Each of the stub rollers 19 has a shaft 100 which extends through an inclined cylindrical bearing assembly 101 mounted in the manner just described, and carries at its outer end a sprocket block comprising two sprocket wheels 112 and 113. The sprocket wheel 112 of the short stub roller 19 adjacent the first stub roller nearest to the inlet end wall of the furnace is connected by a drive chain 114 to the sprocket wheel 104, which is driven directly from the hydraulic motor 92. A similar drive chain 114 connects the sprocket wheel 113 to the similar sprocket wheel 113 on the next roller and so on so that simultaneous drive is transmitted to all the bottom rollers 19 at the loading station from the hydraulic motor 92.

In FIGS. 5 and 8 the bottom stub rollers 19 are mounted inside the furnace to provide the continuation of the track for the carriage 18. A bottom stub roller 19 is located in each of the two spaces between the first three upright rollers 16 of the furnace. Thereafter there is a bottom roller 19 in alternate spaces between the upright rollers 16, except at the exit end of the furnace where there is a bottom roller in each of the spaces between the last three upright rollers. The bottom stub rollers 19 in the furnace have longer ferrules and, as shown in FIG. 9, their shafts 103 are similarly mounted in cylindrical bearing assemblies 101 which are mounted beneath the furnace.

Means are provided for adjusting the extent of projection of each of the longer stub rollers 19 into the furnace, through the upright rollers 16 in the furnace, so as to align the stub rollers to form the track for engagement by the face 20 of the carriage 18. In order to effect this adjustment the cylindrical bearing assembly 101 of each of the rollers 19 in the furnace is mounted on an adjustable base unit. The base units are mounted on two parallel girders 114 which run along the length of the apparatus beneath the furnace and are fixed beneath the cross girders 2. The bearing assembly 101 is fixed to a plate 115 by bolts which pass through sleeves 116 integral with the body of the bearing assembly 101, the plate being pivoted at its upper end between lugs 117 provided on one end of an inclined top plate 118 which is joined to a flat base plate 119 by webs 120. A set screw 121 is threaded through a hole formed in the lower end of the inclined top plate 118 to bear against the underface of the plate 115 on which the bearing assembly 101 is fixed. Adjustment of the screw 121 adjusts the angle of inclination of the plate 115 and hence adjusts the angle of inclination of the bottom rollers 19 in the furnace. Locking bolts 122 are fitted through the plate 115 and are screwed into the inclined top plate 118 to clamp the plate 115 at the set inclination when the rollers 19 are correctly angled.

The base plate 119 is seated on a bed plate 123 which is bolted to the top of the girders 114. A longitudinal groove 124 in the underface of the base plate 119 mates with a spline 125 on the upper face of the bed plate 123.

An adjuster screw 126 is threaded through a mounting block 127 which is bolted to the rear end of the bed plate 123. The inner end of the adjuster screw 126 couples with a plate 128 which is bolted to the back face of the unit. Locking bolts 129 pass downwardly through slots 130 cut in the base plate 119 and are threaded into apertures in the bed plate 123. In order to adjust the extent of projection of the roller 19 between the rollers 16, the bolts 129 are loosened and the position of the base unit supporting the bearing assembly 101, relative to the bed plate 123, is adjusted by rotation of the screws 126. When the roller is correctly positioned the base unit is clamped to the bed plate by tightening the locking bolts 129.

The stub rollers 19 in the furnace can thus be correctly aligned to form the straight track for the carriage 18 by adjustment of both the angle of inclination of the rollers and the extent of projection of the rollers and when the required position is reached the rollers are clamped.

Each of the shafts 103 of the rollers 19, as illustrated in FIG. 9, extends rearwardly beyond the bearing assembly 101 and is connected by a flexible coupling 131 to an intermediate drive shaft 132, the other end of which is connected by a further flexible coupling 133 to an output drive shaft 134 from the lower gear box 109. As shown, the gear box 109 has three further output shafts 134 for individually driving the next three stub rollers 19 in the furnace.

At the far end of the gear box 109 there is an output shaft connected by a flexible coupling to the input shaft of a further gear box 109 which provides the drive for the next group of three stub rollers 19 in the furnace. The flexible couplings to all the rollers permit the ready adjustment, in the manner just described, of the angle of inclination and the extent of projection of each of the rollers.

The carriage 18 which constitutes the movable support for a sheet of glass is illustrated in more detail in FIGS. 10 and 11. The carriage is made of steel sheet bent to an angle so as to provide two faces which match the acute angle between the upright rollers 16 and the stub rollers 19. The upright face 20 of the carriage 18 is the longer face and carries two support plates 140 the upper edge of each of which is widened to form a support shoulder 141 whose upper surface 142 is provided with a non-slip refractory coating. The rear edge of the upper surface 142 of the shoulder 141 is formed with an upstanding land 143 of width which determines the minimum offset distance of the lower edge 144 of the glass sheet 17 from the supporting surface of the upright rollers 16 when the carriage is in position for conveying through the furnace with the face 20 of the carriage bearing against the supporting surfaces of the rollers 16 and with the lower shorter face 21 of the carriage supported on the bottom stub rollers 19. FIG. 11 illustrates how the upper edge of the glass sheet rests against the rollers when the glass is loaded at the loading station and FIG. 10 shows how the support shoulders are adapted to the particular shape of the sheet of glass to be bent. The shape of the glass sheet matches the styling of the vehicle in which the sheet is to be embodied.

By reason of the common drive to the rollers 16 and 19 from the single hydraulic motor 92 and by choice of suitable gearing with similar frictional engagement of the faces 20 and 21 of the carriage with the upright rollers 16 and the stub rollers 19 respectively, the movable carriage 18 is always advancing with the same linear speed as the surface linear speed of the upright rollers 16 against which the sheet of glass 17 carried by the carriage 18 rests and which provide transient support for the upper edge of the glass sheet. FIG. 10 illustrates how the support shoulders 141 on the carriage 18 are adapted to a particular shape of a sheet of glass being heated in the furnace, in this case a sheet cut to shape for eventual bending to form a windscreen of a motor vehicle.

The carriage 18 also carries a stop member 145 at its front end for eventual abutment against a carriage stop 146, FIG. 2b, to arrest the travel of the carriage at the end of the processing stage performed while the glass is supported on the carriage. Also mounted on the carriage is a striker 147 near the front end of the carriage for engagement with a limit switch S1, FIG. 2a, as the front end of the carriage carrying the glass sheet is just entering the furnace through the entrance mouth 30, 31, through the furnace as will be described. A further striker 148 is mounted on the carriage at about a midway location also to engage a limit switch actuating member 149, FIG. 2a, which operates a switch S2 and is located in the furnace to control the regulation of the speed of travel of the carriage through the furnace when the whole of the glass sheet is within the furnace.

Figure 12:
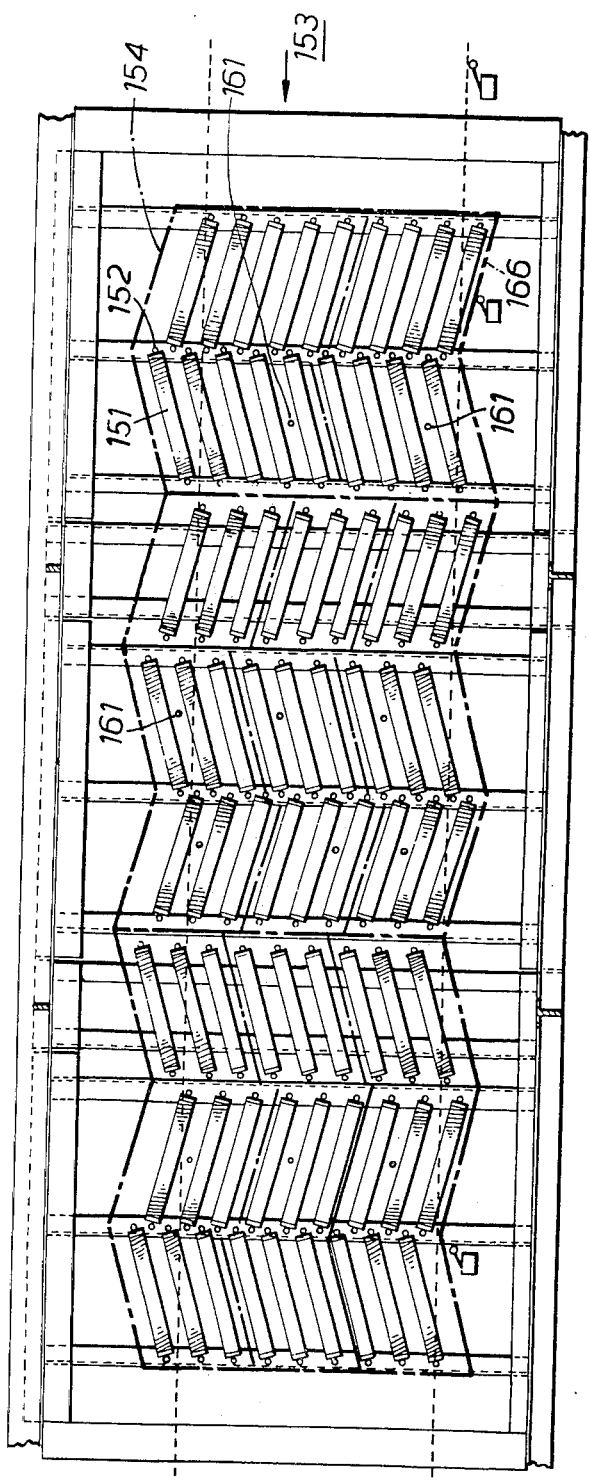
FIG. 12 illustrates an arrangement of electrical heaters on one side wall of the furnace.
Figure 13:
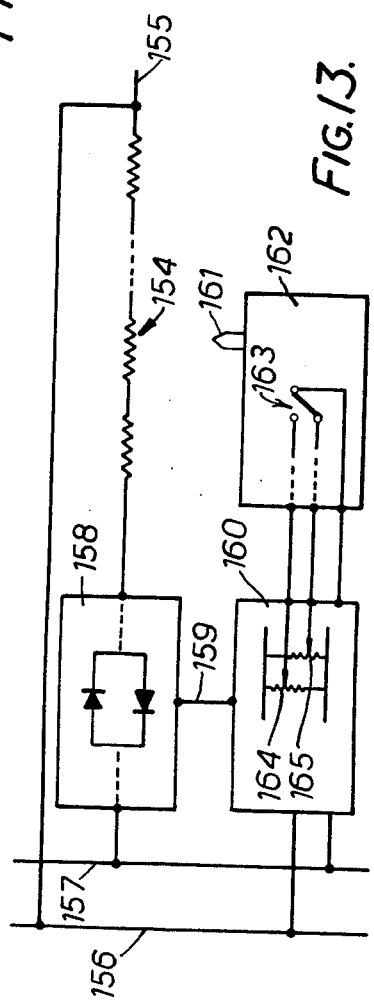
FIG. 13 shows diagrammatically a thyristor control circuit for controlling current supply to a group of the heaters of FIG. 12.

FIGS. 5 and 12 illustrate the way in which the electric heaters 32 are mounted on the furnace side wall 12 facing the back of the assembly rollers 16. Each of the heaters is an electric resistance wire heater 151, the wire being wound on a ceramic rod which is carried by two connection rods 152 which extend through the side wall 12 of the furnace. Current is supplied through these connection rods 152. The heaters 151 are arranged in a chevron pattern and the heaters are connected together in series in groups, which groups are delimited by the solid lines in FIG. 12. For example, the upper group of heaters first encountered by the glass which is advanced into the furnace in the direction of arrow 153, is indicated at 154 and comprises ten heaters 151 which are connected together in series as illustrated in FIG. 13. One end 155 of the series connection of the heaters is connected to one line 156 of a power supply. The other line 157 of the power supply is connected to a thyristor control circuit 158 of conventional design which controls the flow of current through the series-connected group of heaters 154 in response to firing pulses supplied to the trigger electrodes of the thyristors on lines indicated by the firing pulse line 159 which is connected to a firing pulse generating circuit 160 which is also supplied with power from the lines 156 and 157.

A control thermocouple 161 is mounted in the furnace within the limits of the group of heaters 154. This thermocouple is connected into a temperature control circuit 162 of conventional design, and controls a simple on/off switching indicated by the two-way switch 163 to switch into the blocking oscillator of the firing pulse generating circuit 160, control by one or other of two potentiometers 164 and 165.

The settings of the potentiometers 164 and 165 are such as to give, in known manner, respectively high and low levels of power dissipation in the group of heaters 154 so that in response to the temperature in that part of the furance within the limits of the group of heaters 154 as sensed by the thermocouple 161, the level of power dissipation can be switched between the high and low levels in order to maintain the sensed temperature at a desired value set by a set point adjustment provided in known manner by adjustment of a potentiometer in the control circuit 162.

Eight series connected heaters are arranged in chevron fashion in a second group 166 at the inlet end of the furnace, lying below the group 154. Thereafter the heaters are arranged in two sets of three groups, each group consisting of nine heaters connected together in series and each having an associated control thermocouple 161 and being supplied through a thyristor control circuit under control of the appropriate thermocouple and temperature control circuit as illustrated in FIG. 13.

Operation of each group of heaters can be set individually by the set point adjustment in the associated temperature control circuit. For example for heating a sheet of glass 2 mm thick to a bending temperature of 590° which is obtained substantially uniformly throughout the whole of the glass sheet, the set points of the temperature control circuits may be such that the temperature at the thermocouple 161 within the group of heaters 154 is 700°C, and the temperature at the thermocouple 161 within the group 166 is 750°C. Of the subsequent groups of heaters the temperatures at the thermocouples 161 are 700°C for the upper groups, 725°C for the middle groups and 750°C for the lower groups.

FIG. 14 illustrates the electrical heaters 33 which are mounted on the side wall 13 of the furnace. In this drawing the direction of glass movement is shown from the left-hand end of the FIGURE. The heaters 151 which are wire wound heaters on ceramic tubes mounted on connection rods 152 extending through the side wall 13 of the furnace, are divided up into groups. These groups are indicated by chain lines and are similar to the groups of heaters in FIG. 11 with the addition of a further group of heaters 170 with a control thermocouple 171. This additional group of heaters comprises a row of six heaters extending along the bottom of the longer side wall of the furnace 13 just above the cullet clearance exit passages 23. The heaters of FIG. 14 directly face the surface of the glass which is opposite the face engaging the rollers 16, and each group of heaters is controlled by a thyristor control circuit of the kind illustrated in FIG. 13 with a simple on/off switching arrangement. The temperature at the thermocouple 171 in the upper group of the two groups at the entrance end of the furnace is maintained at 700°C and the lower group at 750°C for the heating of a 2 mm thick glass sheet to 590°C for bending as described above. The temperature at the control thermocouple 171 in the bottom row of heaters 170 is at 750°C, and in the upper, middle and lower groups of heaters of the further arrangements of three groups of heaters as illustrated the temperatures at the control thermocouples 171 are respectively at 700°C, 725°C and 750°C.

Figure 15:
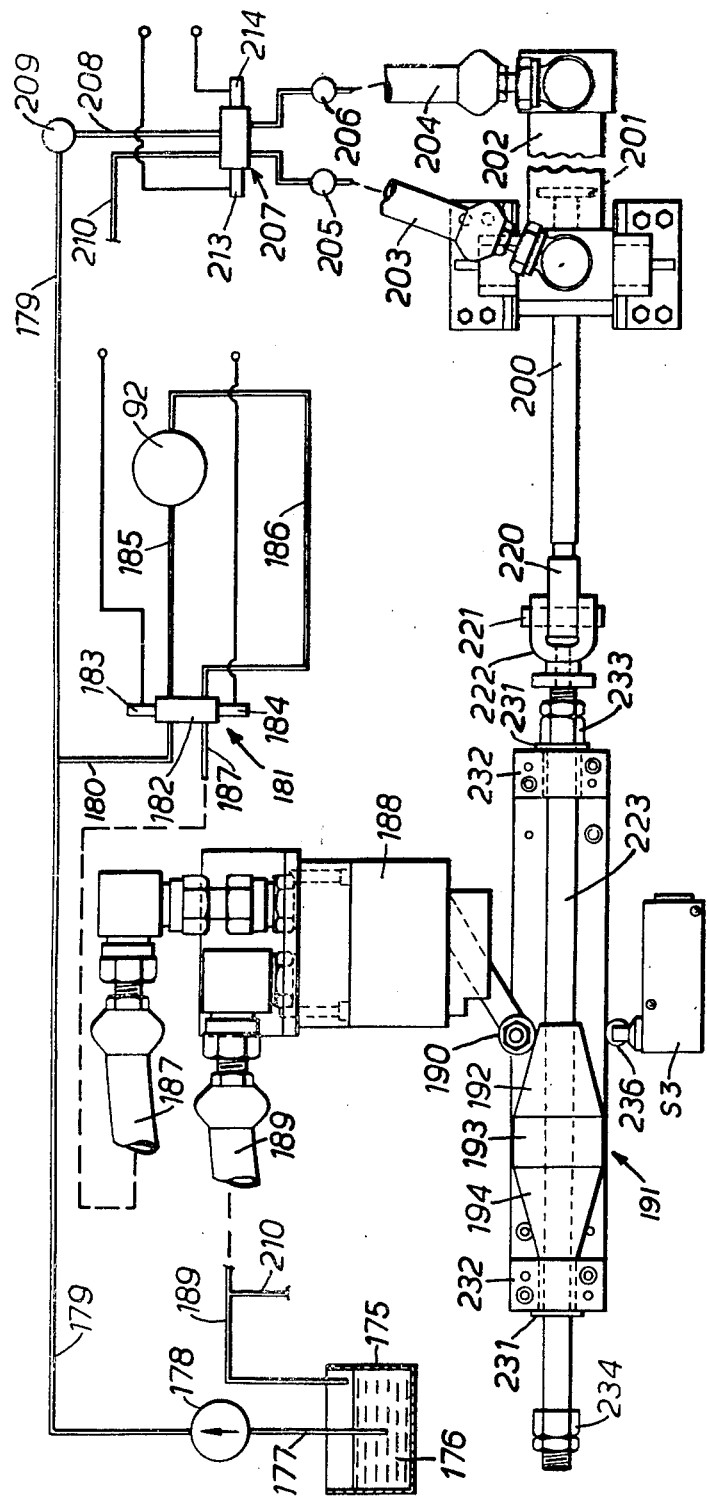
FIG. 15 is a diagram of an hydraulic circuit illustrating the control of the supply of hydraulic fluid to a speed-controlled hydraulic motor which provides the main drive for the rollers.

FIG. 15 illustrates the connection and control of supplies of hydraulic fluid to the hydraulic motor 92. A sump 175 containing hydraulic fluid 176 has a supply pipe 177 connected to the inlet to a pump 178 which is driven by an electric motor, not shown. The outlet from the pump 178 is connected to a main supply line 179.

A branch line 180 from the main supply line 179 is connected to one inlet of a solenoid-operated fourway directional control spool valve 181 comprising a main valve body 182 and having two operating solenoids 183 and 184. The valve 181 is of the "locked centre" type, that is, when both operating solenoids 183 and 184 are de-energised the valve spool is locked in a central position preventing liquid flow. One outlet line 185 from the valve 181 is connected to the hydraulic motor 92 and an exhaust line 186 from the motor is connected back to an exhaust inlet of the valve 181. This exhaust inlet is selectively connected through the valve 181 to a line 187 which is connected through a tappet-operated flow control valve 188 to a return line 189 which feeds into the sump 175. Solenoid 184 of a valve 181 is normally permanently energised so that liquid under pressure is normally continuously supplied to the motor 92 on line 185. The degree of opening of the flow-control valve 188 regulates the rate at which liquid is permitted to exhaust from the motor 92 and thereby regulates the motor speed.

The control valve 188 is operated by a cam follower roller 190 which bears on a sliding cam 191 having three effective surface portions 192, 193 and 194. The central surface portion 193 stands proud of the other surface portions 192 and 194 which fall away to either side of the control portion 193. The cam 191 is mounted on one end of a piston rod 200 which is connected to a piston 201 which is slidable in a cylinder 202.

Ports at the ends of the cylinder 202 are connected by lines 203 and 204 respectively through one-way restrictor valves 205 and 206 to outlet ports of a further four-way directional control valve 207 which is also of the "locked centre" type and is supplied with hydraulic fluid under pressure on a line 208 which is connected to the main supply line 179 through a pressure reducing valve 209. Another port of the valve 207 is connected by an exhaust line 210 to the fluid return line 189.

A knuckle 220 on the free end of the piston rod 200 is connected by a pivot pin 221 into a fork 222 which is coupled to one end of a rod 223 which carries the cam 191. The rod 223 is slidably mounted in bearings 231 carried in housings 232 which are fixed to a base plate with also carries the cylinder 202. Adjustable stop members 233 and 234 on the cam-carrying rod 223 abut against the bearing housings to define the limits of movement of the cam by the piston 201.

A switch S3 which is also mounted on the base plate has a switch-operating roller 236 which is engaged by the cam surface 193 and is opposite the cam follower roller 190.

With the cam 191 in its initial fully-extended position shown in FIG. 15, determined by the stop 233 abutting against the right-hand bearing 231, the cam follower roller 190 bears on the portion 192 of the cam surface, the flow of hydraulic fluid to the motor regulates the speed of the motor 92 to a value which drives the upright rollers 16 and the stub rollers 19 at a speed to advance the carriage and the glass at a low forward creep speed of 0.025 m/sec. When the piston 201 is partially retracted into the cylinder 202 and the roller 190 bears on the highest portion 193 of the cam surface the control valve 188 regulates the flow of hydraulic fluid from the motor 92 to produce a high effective speed of the rollers 16 and 19 to advance the carriage and the glass at a speed of 0.4 m/sec.

At the other extreme of the traverse of the rod 223 by full retraction of the piston 201 until the stop 234 abuts against the left-hand bearing 231, the roller 190 bears on the portion 194 of the cam surface. This gives a speed of the rollers 16 and 19 which advances the carriage and the glass at a speed of 0.06 m/sec. which is the speed at which the glass is advanced through the furnace as it is heated.

Operation of the apparatus begins with valve 207 locked in its central position, with hydraulic fluid under pressure on line 204 to the cylinder 202, so that the piston rod 200 is fully extended and the cam 191 is positioned with the cam roller 190 on cam surface 192. In this position of the cam 191 the valve 188 is only slightly open so that the motor runs at its slowest set speed and the rollers 16 and 19 are driven at a speed to advance the carriage and the glass at a forward creep speed of 0.025 m/sec. for example.

A carriage 18 carrying a sheet 17 is held at the loading station in slipping engagement with the rollers 16 and 19 by a retractable stop 241, FIG. 2a. Retraction of the stop permits the carriage 18 and a supported glass sheet 17 to move forward on the rollers at the forward creep speed of 0.025 m/sec. until the striker 147 on the carriage engages the limit switch S1 which is located just outside the entrance 30, 31 to the furnace, the leading edge of the sheet 17 then being just within the furnace entrance.

Figure 16:
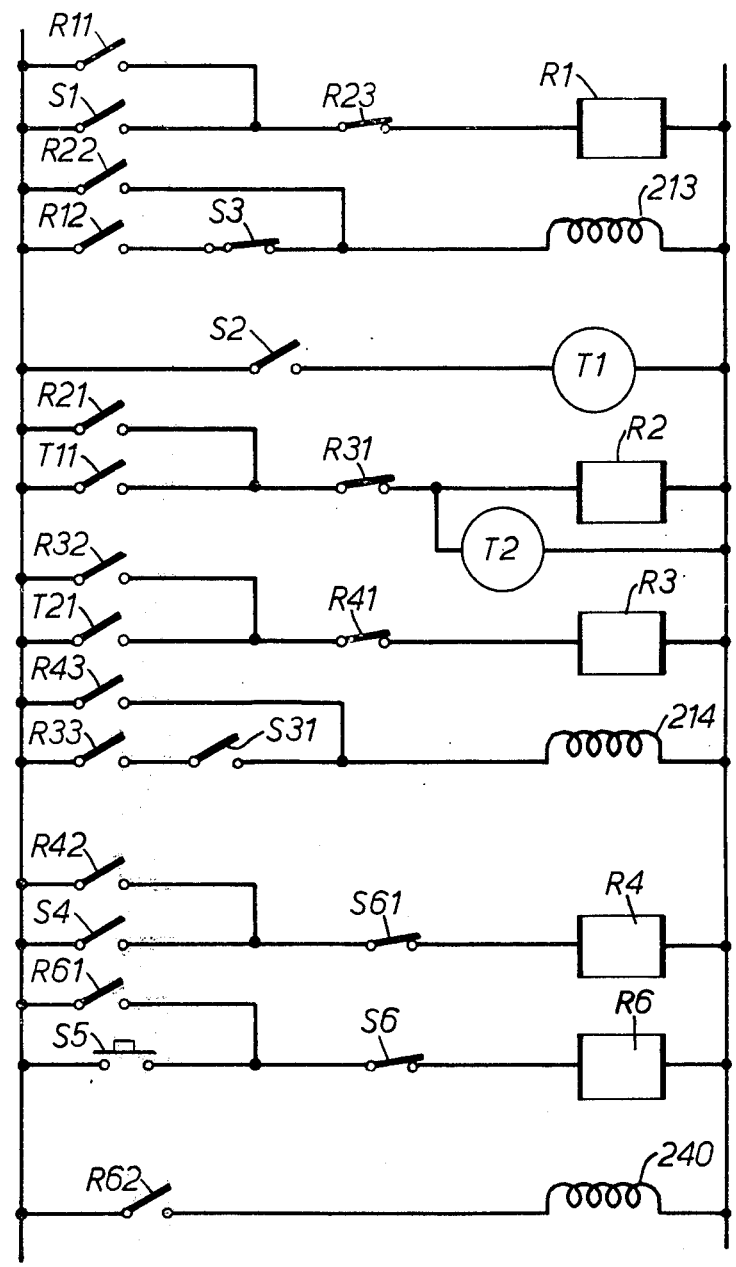
FIG. 16 is an electrical switching circuit which controls the hydraulic circuit of FIG. 15.

The limit switches S1 and S2 are connected in an electrical switching circuit which is illustrated diagramatically in FIG. 16.

The limit switch S1, which is normally open is connected in series with normally closed contacts R23 of a relay R2 to the solenoid of a relay R1. Holding contacts R11 on the relay R1 are connected in parallel with the switch S1. When striker 147 on the carriage engages the switch S1, relay R1 is energised to close normally open contacts R12 which are connected in series with the normally closed cam limit switch S3 and with the solenoid 213 of valve 207.

The energisation of the solenoid 213 causes pressure fluid to be fed on line 203 to the cylinder 202 to retract the piston 201 into the cylinder so that the cam moves from its initial position in which the roller 190 is on the cam surface portion 192 to the position in which the roller 190 is on the highest part 193 of the cam. This operates valve 188 to increase the supply of fluid to the motor 92 so that the roller speed is accelerated to impart the entry speed of 0.4 m/sec. to the carriage and the glass.

In its central position the high part 193 of the cam opens switch S3 which de-energises solenoid 213 so that piston 201 is held in its central position in the cylinder 202.

The actuating member 149 for the limit switch S2 is mounted just inside the furnace. The switch S2 is normally open and when the actuating member 149 is engaged by the striker 148 half way along the carriage, the trailing edge of the glass sheet 17 is just entering the furnace. This limit switch S2 is connected in series with a timer T1 which is set to a delay of up to 5 seconds to ensure that the trailing edge of the sheet is inside the furnace before the rollers are decelerated to the speed at which the carriage and glass are advanced through the furnace.

At a set period after the switch S2 is closed, contacts T11 of the timer T1 close. These contacts are in series with normally closed contacts R31 of a relay R3 and with the solenoid of the relay R2 which has holding contacts R21 in parallel with the timer contacts T11, and contacts R22 which are normally open, and are in parallel with the series-connected cam limit switch S3 and relay contacts R12.

When the timer T1 operates to close the switch T11 the relay R2 is energised and the contacts R22 close to re-energise the solenoid 213 of the valve 207. Pressure fluid is again supplied to the cylinder 202 on line 203 and retraction of the piston 201 continues to bring the roller 190 onto the cam part 194. The opening of the valve 188 then determines rotation of the rollers at a speed giving a forward speed of the carriage and the glass in the furnace of 0.06 m/sec. As the roller 190 moves down the surface 194 the rollers 16 and 19 decelerate, and decelerate the carriage and the glass from the fast entry speed of 0.4 m/sec. to the furnace speed of 0.06 m/sec. which is reached by the time the trailing edge of the sheet is inside the furnace.

When the relay R2 is energised its normally closed contacts R23 which are in series with relay solenoid R1 open to cut out relay R1. As the cam moves to the right the switch S3 recloses but the solenoid 213 remains energised through the closed contacts R22.

A second timer T2, which can be set to a time delay of up to 5 minutes, is connected in parallel with the relay R2, and operation of this timer T2 is initiated when timer contacts T11 close and relay R2 is energised. The timer T2 is held operating by the closing of the holding relay contacts R21 and this timer is set to a time delay and closes contacts T21 when the glass has been traversing through the furnace at the furnace speed for the selected time for heating the glass to a required temperature in dependence on the thickness of the glass, the height of the glass sheet and the angle of the supported sheet.

After the set time delay the timer T2 operates to close contacts T21 which are in series with normally closed contacts R41 of a relay R4 and with the solenoid of relay R3.

Holding contacts R32 on relay R3 are in parallel with the timer contacts T21 and when relay R3 operates the normally closed contacts R31 in series with relay R2 open to cancel relay R2 which opens contacts R22, thereby de-energising solenoid 213 at the same time as contacts R33 of relay R3 close and energise through closed contacts S31 of the limit switch S3, the other solenoid 214 of the valve 207.

The valve 207 switches pressure fluid onto line 204 to the bottom end of the cylinder 202 and the extension of the piston rod 200 out of the cylinder begins. The cam roller 190 runs up the cam surface 194 onto the high part 193 and the motor accelerates to give the maximum carriage exit speed of 0.4 m/sec. to convey the glass as the required pre-quenching temperature from the furnace and between the blowing frames 37.

The striker 147 on the carriage which is accelerating out of the furnace engages a limit switch S4 mounted between the blowing frames 37, and closes that switch to energise the solenoid of a relay R4. When relay R4 is energised holding contacts R42 in parallel with switch S4 close; contacts R41 open to de-energise relay R3; and contacts R43, which are in parallel with the contacts S31 and R33, close to energise solenoid 214 of valve 207, by-passing the open contacts R33 and S31.

The extension of the piston 201 out of the cylinder 202 continues and the roller 190 runs down the surface 192 so that the motor 92 is decelerated to impart to the carriage and the glass the creep speed of 0.025 m/sec. and is held at this speed with the stop member 233 abutting against the right-hand bearing 231, as the hot glass sheet is carried at that speed between the blowing frames 37.

A reset press button switch S5 is connected in series with a normally closed limit switch S6 which is located right at the far end of the conveyor for engagement by the striker 145 on the carriage 18 when the carriage is nearing the end of the conveyor. With the switch S5 closed, when the switch S6 closes the solenoid of a relay R6 is energised closing holding contacts R61 in parallel with the reset switch S5, and contacts R62 in series with the coil 240 of the exit roller clutch 39. This clutch coil 240 is energised throughout operation once the reset switch S5 has been closed so that the conveyor rollers at the exit end of the furnace are running at the same speed as the furnace rollers until the carriage engages the switch S6 whereupon the exit rollers are declutched and come to rest. Normally closed contacts S61 of switch S6 are in series with relay R2 and are opened when the carriage operates the switch S6 to de-energise the solenoid of relay R4.

The motor 92 is now running at a speed to impart to the carriage the forward creep speed of 0.025 m/sec. and a further glass sheet for processing is loaded as the toughened sheet and its carriage are being removed from the exit rollers. The button of the reset switch S5 is pressed to re-engage the clutch 37, the carriage stop at the loading station is retracted and processing of the next sheet begins.

FIG. 11 illustrates how the upper edge of the glass sheet rests against the near-vertical support rollers 16 when the cold glass sheet 17 is loaded on to the support carriage 18 at the loading station and during the initial part of the heating of the glass. As the glass is heated during its travel through the furnace and the glass approaches the temperature in the range 580°C to 660°C to which it is to be heated, the glass becomes sufficiently softened to relax against the support rollers 16, and could become unacceptably deformed if it were maintained at that temperature for too long.

Initially the upper part of the sheet relaxes against the rollers 16 and the depth of effective supporting surface of the rollers 16 must always be sufficient to accommodate permissible relaxation.

The timer T2 is set so that the glass has reached its desired temperature which is substantially uniform over the whole sheet and through its thickness by the time the hot sheet is accelerated out of the furnace to a further processing operation for example toughening as just described, or bending and subsequent toughening, before the amount of deformation of the sheet by initial relaxation of the upper part of the sheet against the rollers 16, followed, if acceptable, by outward bulging of the lower part of the sheet as described above, exceeds the limits of acceptable deformation of the sheet.

The furnace heater temperature settings of 700°C, 725°C and 750°C achieve a mean furnace temperature of about 730°C. The time of transit of the glass sheet through the furnace at that temperature is regulated in order to ensure that the glass sheet is heated to a required final temperature in the set time of transit. During the transit time the glass sheet may deform and at the end of the heating period will have reached an actual deformation index value as described above. The glass sheet is acceptable if the actual deformation index is less than the critical deformation index based on acceptable deformation of the glass sheet by the time the sheet is being discharged from the furnace at the higher discharge speed of 0.4 m/sec.

The heating time is set either by setting the transit speed of the glass through the furnace or by setting the time of transit of the glass through the furnace at a fixed speed prior to acceleration of the glass when it has reached a predetermined temperature and discharge through the furnace exit.

The transit speed can be set by adjusting the position of the stop member 234 on the cam rod 223 in order to vary the limit of retraction of the piston 201 into the cylinder 202 and thereby determine the position of the roller 190 on the cam surface 192 and the extent of opening of the valve 188 which controls the speed of the hydraulic motor 92. A range of transit speeds of the glass sheet through the furnace of from 0.025 m/sec. to 0.06 m/sec. is readily achieved in this way.

Other settings of furnace temperature may be employed as set out in Table I.

TABLE I

| Heating Sections Temperature (°C) | | | Mean Furnace Temperature (°C) |
|---|---|---|---|
| 680 | 705 | 730 | 710 |
| 700 | 725 | 750 | 730 |
| 720 | 745 | 770 | 750 |
| 780 | 805 | 830 | 810 |

At any particular mean furnace temperature the time taken for a sheet to reach a required final temperature is dependent on its thickness. The following Tables II to VII give examples of operation for a range of glass thicknesses from 2.2 mm to 15 mm of heating times required to achieve a final glass temperature in the range 580°C to 700°C.

Parameters common to each of the examples in Tables II to VI are as follows:

| | |
|---|---|
| Angle of rollers 16 | = 5° to vertical |
| Offset of bottom edge of sheet from rollers 16 | = 2 mm |
| Height of glass sheet | = 0.76 m |
| Density of glass (soda-lime-silica) | = 2.5 g/cm$^3$ |
| Maximum permissible bulge in sheet | = 0.5 mm |

TABLE II

Final Glass Temperature = 580°C.

| Glass Thickness | Critical Deformation Index | Mean Furnace Temperature (°C) | Heating Time (Sec.) | Deformation Index |
|---|---|---|---|---|
| 2.2 mm | $3.8 \times 10^{-9}$ | 710 | 67 | $3.6 \times 10^{-12}$ |
| | | 750 | 56 | $2.7 \times 10^{-12}$ |
| | | 810 | 45 | $1.9 \times 10^{-12}$ |
| 3 mm | $7.2 \times 10^{-9}$ | 710 | 88 | $4.7 \times 10^{-12}$ |
| | | 750 | 73 | $3.5 \times 10^{-12}$ |
| | | 810 | 57 | $2.5 \times 10^{-12}$ |
| 4 mm | $12.7 \times 10^{-9}$ | 710 | 115 | $6.2 \times 10^{-12}$ |
| | | 750 | 95 | $4.6 \times 10^{-12}$ |
| | | 810 | 75 | $3.2 \times 10^{-12}$ |
| 5 mm | $19.8 \times 10^{-9}$ | 710 | 141 | $7.6 \times 10^{-12}$ |
| | | 750 | 117 | $5.7 \times 10^{-12}$ |
| | | 810 | 93 | $4.0 \times 10^{-12}$ |

TABLE III

Final Glass Temperature = 610°C.

| Glass Thickness | Critical Deformation Index | Mean Furnace Temperature (°C) | Heating Time (Sec.) | Deformation Index |
|---|---|---|---|---|
| 2.2 mm | $3.8 \times 10^{-9}$ | 710 | 79 | $9.6 \times 10^{-11}$ |
| | | 750 | 65 | $6.8 \times 10^{-11}$ |
| | | 810 | 51 | $4.5 \times 10^{-11}$ |
| 3 mm | $7.2 \times 10^{-9}$ | 710 | 104 | $1.3 \times 10^{-10}$ |
| | | 750 | 85 | $8.8 \times 10^{-11}$ |
| | | 810 | 65 | $5.9 \times 10^{-11}$ |
| 4 mm | $12.7 \times 10^{-9}$ | 710 | 136 | $1.6 \times 10^{-10}$ |
| | | 750 | 110 | $1.1 \times 10^{-10}$ |
| | | 810 | 85 | $7.6 \times 10^{-11}$ |
| 5 mm | $19.8 \times 10^{-9}$ | 710 | 167 | $2.0 \times 10^{-10}$ |
| | | 750 | 135 | $1.4 \times 10^{-10}$ |
| | | 810 | 105 | $9.4 \times 10^{-11}$ |

TABLE IV

Final Glass Temperature = 650 °C.

| Glass Thickness | Critical Deformation Index | Mean Furnace Temperature (°C) | Heating Time (Sec.) | Deformation Index |
|---|---|---|---|---|
| 2.2 mm | $3.8 \times 10^{-9}$ | 710 | 102 | $3.2 \times 10^{-9}$ |
| | | 750 | 80 | $1.9 \times 10^{-9}$ |
| | | 810 | 60 | $1.2 \times 10^{-9}$ |
| 3 mm | $7.2 \times 10^{-9}$ | 710 | 134 | $4.1 \times 10^{-9}$ |
| | | 750 | 104 | $2.5 \times 10^{-9}$ |
| | | 810 | 77 | $1.5 \times 10^{-9}$ |
| 4 mm | $12.7 \times 10^{-9}$ | 710 | 175 | $5.3 \times 10^{-9}$ |
| | | 750 | 135 | $3.3 \times 10^{-9}$ |
| | | 810 | 100 | $2 \times 10^{-9}$ |
| 5 mm | $19.8 \times 10^{-9}$ | 710 | 216 | $6.5 \times 10^{-9}$ |
| | | 750 | 166 | $4 \times 10^{-9}$ |
| | | 810 | 124 | $2.4 \times 10^{-9}$ |
| 6 mm | $28.8 \times 10^{-9}$ | 710 | 258 | $7.9 \times 10^{-9}$ |
| | | 750 | 198 | $4.8 \times 10^{-9}$ |
| | | 810 | 147 | $2.9 \times 10^{-9}$ |
| 8 mm | $50.8 \times 10^{-9}$ | 710 | 344 | $10.6 \times 10^{-9}$ |
| | | 750 | 262 | $6.4 \times 10^{-9}$ |
| | | 810 | 194 | $3.9 \times 10^{-9}$ |

TABLE V

Final Glass Temperature = 665°C.

| Glass Thickness | Critical Deformation Index | Mean Furnace Temperature (°C) | Heating Time (Sec.) | Deformation Index |
|---|---|---|---|---|
| 3.0 mm | $7.2 \times 10^{-9}$ | 710 | 163 | $14.4 \times 10^{-9}$ |
|  |  | 750 | 121 | $8.7 \times 10^{-9}$ |
|  |  | 810 | 89 | $4.5 \times 10^{-9}$ |
| 4.0 mm | $12.7 \times 10^{-9}$ | 710 | 199 | $18.3 \times 10^{-9}$ |
|  |  | 750 | 147 | $10.1 \times 10^{-9}$ |
|  |  | 810 | 107 | $5.79 \times 10^{-9}$ |
| 6.0 mm | $28.8 \times 10^{-9}$ | 710 | 290 | $27.0 \times 10^{-9}$ |
|  |  | 750 | 216 | $14.9 \times 10^{-9}$ |
|  |  | 810 | 158 | $8.48 \times 10^{-9}$ |
| 8.0 mm | $50.8 \times 10^{-9}$ | 710 | 388 | $36.2 \times 10^{-9}$ |
|  |  | 750 | 296 | $19.9 \times 10^{-9}$ |
|  |  | 810 | 207 | $11.4 \times 10^{-9}$ |
| 10.0 mm | $79.2 \times 10^{-9}$ | 710 | 487 | $45.9 \times 10^{-9}$ |
|  |  | 750 | 360 | $25.3 \times 10^{-9}$ |
|  |  | 810 | 260 | $14.4 \times 10^{-9}$ |
| 12 mm | $115.2 \times 10^{-9}$ | 710 | 590 | $56.1 \times 10^{-9}$ |
|  |  | 750 | 436 | $30.9 \times 10^{-9}$ |
|  |  | 810 | 314 | $17.7 \times 10^{-9}$ |

TABLE VI

Final Glass Temperature = 680°C.

| Glass Thickness | Critical Deformation Index | Mean Furnace Temperature (°C) | Heating Time (Sec.) | Deformation Index |
|---|---|---|---|---|
| 6.0 mm | $28.8 \times 10^{-9}$ | 710 | 337 | $94.5 \times 10^{-9}$ |
|  |  | 750 | 236 | $44.4 \times 10^{-9}$ |
|  |  | 810 | 168 | $23.6 \times 10^{-9}$ |
| 8.0 mm | $50.8 \times 10^{-9}$ | 710 | 450 | $127 \times 10^{-9}$ |
|  |  | 750 | 314 | $59.4 \times 10^{-9}$ |
|  |  | 810 | 221 | $31.7 \times 10^{-9}$ |
| 10.0 mm | $79.2 \times 10^{-9}$ | 710 | 565 | $160 \times 10^{-9}$ |
|  |  | 750 | 396 | $75.3 \times 10^{-9}$ |
|  |  | 810 | 278 | $40.1 \times 10^{-9}$ |
| 12.0 mm | $115.2 \times 10^{-9}$ | 710 | 686 | $197 \times 10^{-9}$ |
|  |  | 750 | 479 | $91.0 \times 10^{-9}$ |
|  |  | 810 | 337 | $49.0 \times 10^{-9}$ |
| 15.0 mm | $180 \times 10^{-9}$ | 710 | 880 | $264 \times 10^{-9}$ |
|  |  | 750 | 635 | $122 \times 10^{-9}$ |
|  |  | 810 | 435 | $78 \times 10^{-9}$ |

TABLE VII

Final Glass Temperature = 700°C.

| Glass Thickness | Critical Deformation Index | Mean Furnace Temperature (°C) | Heating Time (Sec.) | Deformation Index |
|---|---|---|---|---|
| 6.0 mm | $89.3 \times 10^{-9}$ | 810 | 184 | $85.0 \times 10^{-9}$ |
| 8.0 mm | $157.5 \times 10^{-9}$ | 810 | 243 | $114 \times 10^{-9}$ |
| 10 mm | $245.5 \times 10^{-9}$ | 810 | 306 | $145 \times 10^{-9}$ |
| 12 mm | $357.0 \times 10^{-9}$ | 810 | 371 | $177 \times 10^{-9}$ |
| 15 mm | $544.0 \times 10^{-9}$ | 750 | 710 | $490 \times 10^{-9}$ |
|  |  | 810 | 497 | $232 \times 10^{-9}$ |

In Table VII only operating conditions for heating glass sheets to 700°C with acceptable relaxation are given. The parameters for each of these examples are:

| | |
|---|---|
| Angle of rollers 16 | = 10° to vertical |
| Offset of bottom edge of sheet from rollers 16 | = 2 mm |
| Height of glass sheet | = 0.61 m |
| Density of glass (soda-lime-silica) | = 2.5 g/cm³ |
| Maximum permissible bulge in sheet | = 0.5 mm. |

In Tables II and III the actual values of deformation index are so much smaller than the critical deformation index, whose value is for a maximum acceptable bulge of 0.5 mm, that the glass sheets will be at the desired final temperature of 580°C or 610°C while still in the initial stages of relaxation of their upper edges against the near-vertical rollers. In setting up the apparatus therefore a more stringent criterion of acceptable deformation with a correspondingly lower value of critical deformation index may be employed.

Some of the results in Table V show that the actual deformation index exceeds the critical deformation index when heating 3 mm thick glass to 665°C with furnace temperatures of 710°C and 750°C and long heating times respectively 163 and 121 seconds, and when heating 4 mm thick glass to 665°C with the furnace temperature at 710°C and a 199 second heating time.

Table VI also demonstrates that slow heating of glass sheets of thickness 6 mm to 15 mm with a low furnace temperature of 710°C leads to unacceptable deformation as the actual deformation index exceeds the critical deformation index. This is also the case when heating 6 mm and 8 mm glass with a furnace temperature of 750°C.

The results set out in Tables II to VI show that for heating a sheet of soda-lime-silica glass whose thickness is in the range 2.2 mm to 15 mm and whose height is at most 0.76 m, and with the support rollers at an angle of 5° to the vertical and the lower edge of the sheet offset about 2 mm from the support, thermal conditions in the furnace and the time of residence of the sheet within the furnace are set to achieve a predetermined temperature of the glass sheet in the range 580°C to 680°C while relaxing the glass sheet by an amount such that the value of deformation index of the hot glass sheet is less than a critical value within the range $3.8 \times 10^{-9}$ to $180 \times 10^{-9}$, which critical value of deformation index is determined by a bulge in the hot glass sheet less than about 0.5 mm.

Further Tables II to V show that for heating a sheet of soda-lime-silica glass whose thickness is in the range 2.2 mm to 4 mm and whose height is at most 0.76 m, and with the support rollers at an angle of 5° to the vertical and the lower edge of the sheet offset about 2 mm from the support, thermal conditions in the furnace and the time of residence of the sheet within the furnace are set to achieve a predetermined temperature of the glass sheet in the range 580°C to 665°C while relaxing the glass sheet by an amount such that the value of deformation index of the hot glass sheet is less than a critical value within the range $3.8 \times 10^9$ to $12.7 \times 10^9$, which critical value of deformation index is determined by a bulge in the hot glass sheet less than about 0.5 mm.

Additionally Table VII shows that for heating a sheet of soda-lime-silica glass whose thickness is in the range 6 mm to 15 mm and whose height is at most 0.61 m, and with the support rollers inclined at an angle of 10° to the vertical and the lower edge of the sheet offset about 2 mm from the support, thermal conditions in the furnace and the time of residence of the sheet within the furnace are set to achieve a predetermined temperature of about 700°C of the glass sheet while relaxing the glass sheet by an amount such that the value of deformation index of the hot glass sheet is less than a critical value within the range $89.3 \times 10^{-9}$ to $544 \times 10^{-9}$, which critical value of deformation index is determined by a bulge in the hot glass sheet less than about 0.5 mm.

The distance by which the bottom edge of the glass sheet is offset from the support plane of the upright roller surfaces in the furnace is relevant in determining the critical deformation index for a glass sheet. This offset may be up to 4 mm but is usually kept as small as possible bearing in mind the significant effect the amount of offset has on the value of the critical deformation index.

The height of the glass sheet is relevant in relation to this offset being a primary factor in determining the gravitational load on the glass while it is being heated; both the height and glass thickness determine the weight of the glass causing the possible bulge.

These factors are therefore relevant in setting the processing conditions so that the glass sheet is heated to the desired temperature without deformation by an amount exceeding the acceptable maximum deformation.

Based on operating experience and on calculations on the basis of the formula set out above to determine the deformation index of the glass sheet, it has been shown that glass sheets of thickness from 2 mm up to 15 mm and of height from 0.6 m to 1.0 m can be heated to a desired temperature in the range 580°C to 640°C with the inclined support rollers at an angle of from 2° to 10° from the vertical and with the offset distance of the bottom edge of the sheet from the rollers up to 4 mm. Within these ranges all glass sheets were satisfactorily processed with relaxation against the upright rollers less than the maximum acceptable deformation of the sheet and with the actual deformation index of the sheet well below the critical deformation index.

For the heating of glass sheets to final glass temperatures of from 640°C up to 700°C with the mean furnace temperature in the range 710°C to 810°C it has been found that, with other conditions unchanged, there is a lower limit to the glass thickness which can be processed. This is illustrated in Table VIII which summarises results for the processing of glass which is offset at a distance of about 2 mm from the surfaces of the near-vertical support rollers. In this table the height of the glass sheet is indicated by H and the angle of the near vertical rollers to the vertical by the angle $\alpha$.

TABLE VIII

| Glass Temp. °C | Furnace Temp. °C | Processable Glass Thickness (mm) | | |
|---|---|---|---|---|
| | | H = 0.6 m $\alpha = 10°$ | H = 0.76 m $\alpha = 5°$ | H = 1 m $\alpha = 2°$ |
| | 810 | 2 – 15 | 2 – 15 | 3 – 15 |
| 650 | 750 | 2 – 15 | 2 – 15 | 6 – 15 |
| | 710 | 2 – 15 | 2 – 15 | 8 – 15 |
| | 810 | 2 – 15 | 2 – 15 | 8 – 15 |
| 665 | 750 | 2 – 15 | 4 – 15 | 15 |
| | 710 | 2 – 15 | 6 – 15 | — |
| | 810 | 3 – 15 | 6 – 15 | — |
| 680 | 750 | 4 – 15 | 10 – 15 | — |
| | 710 | 8 – 15 | — | — |
| | 810 | 12 – 15 | — | — |
| 700 | 750 | 15 | — | — |
| | 710 | — | — | — |

For the glass sheets of least height, that is 0.6 m, a final glass temperature of up to 665°C can be achieved for all thickness from 2 mm to 15 mm.

When the final glass temperature desired is 680°C it is possible to achieve this in glass thicknesses from 3 mm upwards with the higher furnace temperature of 810°C because at this higher furnace temperature the transit time of the glass through the furnace is less and there is less time for distortion to develop in the glass. This is illustrated further by the fact that when the furnace temperature is only 710°C the distortion which developed in glass thinner than 8 mm was beyond the acceptable limits, with the actual deformation index of the glass approaching and exceeding the critical deformation index.

With the same glass height of 0.6 m a final glass temperature of 700°C could not be achieved at all in glass thinner than 15 mm when the furnace temperature was 710°C because the transit time would be so long to heat the thick glass uniformly through its thickness that there would be time for unacceptable distortion to develop. At the higher furnace temperature of 810°C however glass of thickness 12 mm and above could be successfully heated uniformly to 700°C.

The conditions are more stringent when the glass height is 0.76 m and the angle of the rollers to the vertical is 5°. Table VIII shows how for the lower furnace temperatures and the desired glass temperature of 665°C lower limit of thickness which can be successfully processed rises to 6 mm. When a final glass temperature of 680°C is desired this can be achieved in glass 6 mm thick and above when the furnace temperature is 810°C, and in glass 10 mm thick and above when the furnace temperature is 750°C. When the furnace temperature is 710°C the glass could not be successfully processed. Glass thinner than 15 mm could not be heated to 700°C without unacceptable deformation developing.

As would be expected the trend of these results is continued when a higher glass one meter high is processed with the angle of the rollers nearer to the vertical at 2°. The right hand column of Table VIII shows how it is not possible to heat glass of that height and of thickness lower than 15 mm to a temperature of 680°C or 700°C but that other ranges of thickness can be successfully heated to a temperature in the range 650°C to 665°C depending on the furnace temperature; the higher the furnace temperature the wider being the range of glass thicknesses which can be processed.

All these results are concerned with the heating of glass of thickness up to 15 mm thick. Thicker glasses could be processed but the usual commercial thicknesses of glass sheet are comprehended within the range 2 mm to 15 mm.

In place of the support carriage 18 which runs on the lower support rollers 19, the conveyor may include an endless chain extending beneath the upright rollers 16 and engaging chain drive means connected to the driving means for the conveyor.

Supports for the lower edge of the glass sheet are fixed to the chain at spaced positions and the supports are guided along a path offset from the upright rollers by a distance which determines the angle at which a supported glass sheet leans against the rollers.

Such a chain support is illustrated in FIGS. 17 to 20 and in these Figures two endless chains 250 and 251 carrying supports for glass sheets extend through the furnace parallel to each other and beneath and closely adjacent to the support rollers 16. The provision of two chain drives enable two sheets to be present at a time in the apparatus thereby improving output. For example one sheet may be loaded at the loading station while a second sheet is approaching the end of its traverse at a slow speed through the furnace prior to its acceleration out of the furnace when it has reached the desired temperature.

In order to accommodate more than one sheet at a time it is necessary to divide the drive to the upright support rollers 16 into groups so that for example the support rollers against which a sheet is leaning as it is being heated in the furnace are being driven at a slower speed than the rollers against which a sheet leans as it is being accelerated from the loading station into the furnace.

Figure 17B:
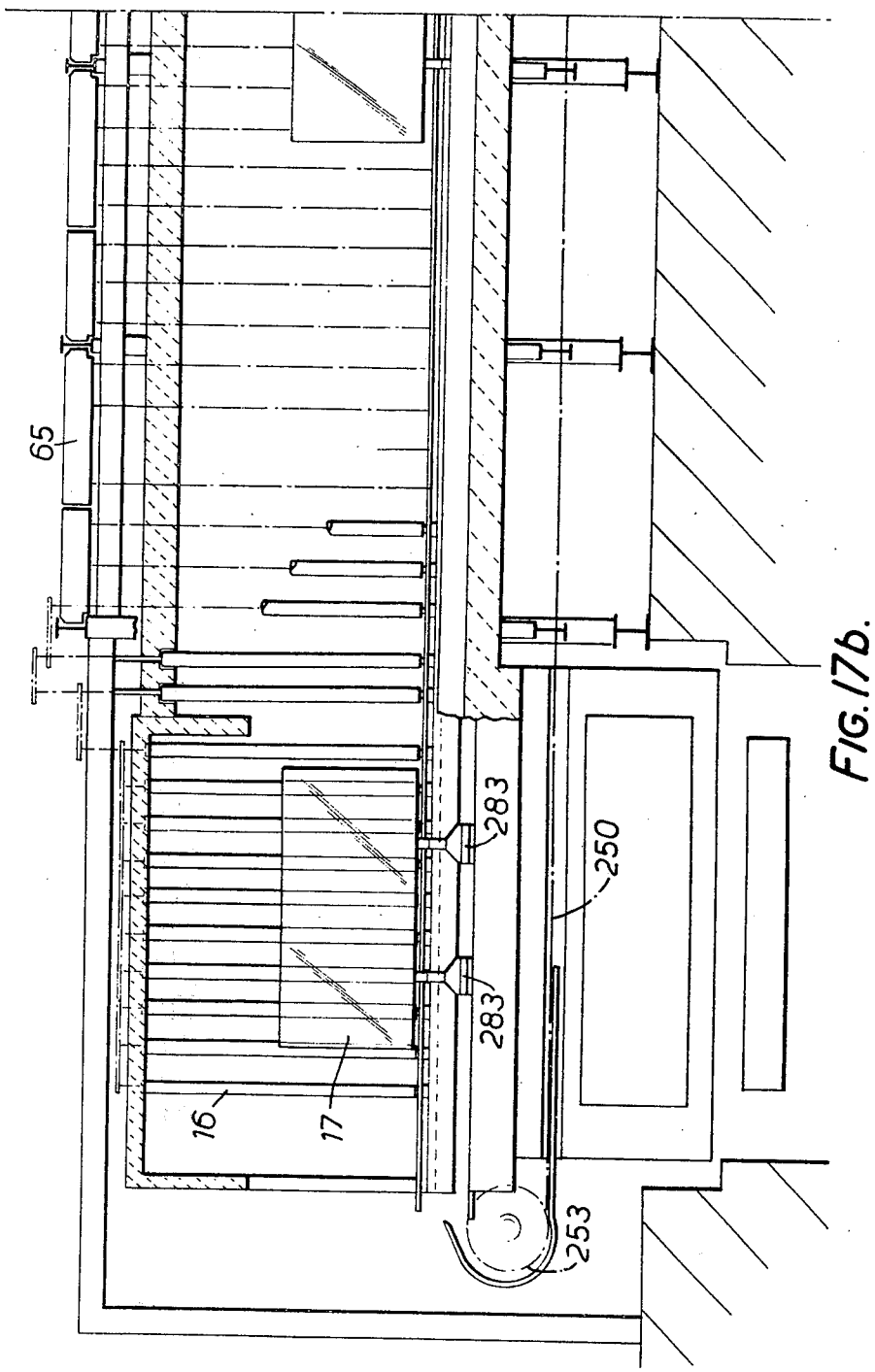

FIG. 17 shows the two chains 250 and 251. The chain 250 extends between a sprocket 252 at the loading station and a drive sprocket 253 beyond the outlet end of the conveyor where toughened glass sheets are unloaded. The sprocket wheel 253 is mounted on a drive shaft 254 on which there is also mounted a drive gear 255 which meshes with an idler gear 256. The idler gear 256 also meshes with a gear 257 which is connected through a clutch 258 to a shaft 259 which is driven through a gear box 260 by a drive motor 261.

The second chain 251 extends between a drive sprocket 262 at the outlet end of the apparatus and a sprocket wheel 263 at the load station. The sprocket wheel 262 is mounted on a shaft 264 on which there is also mounted a gear 265 which meshes with an idler gear 266 which idler gear further meshes with a gear 267 which is connectable through a clutch 268 to the shaft 259.

The gear 267 also meshes with a gear 269 which is connectable by a clutch 270 to a further drive shaft 271. The drive shaft extends from a gear box 272 which is driven by a second motor 273. The drive shaft 271 is connected to a clutch 274 which can be engaged to drive a further gear 275 which meshes with the gear 257. A further output shaft from the gear box 260 is indicated at 276 and this shaft drives through a right angled drive unit 277 the gear boxes which drive a central constant speed section of the upright rollers 16 in the furnace.

An output shaft 279 from the gear box 272 connected to the motor 273 is connected to right angled drives 280 which provide the drive to groups of gear boxes which drive variable speed sections of the support rollers 16. A first variable speed, section 281 extends from the inlet to the furnace up to a constant speed section 278 and a second, variable speed, section 282 extends from the constant speed section 278 to the outlet from the furnace. By selective engagement of the clutches 258, 268, 270 and 274 the different sections of the support rollers can all be driven at the same speed or at different speeds.

Figure 18:
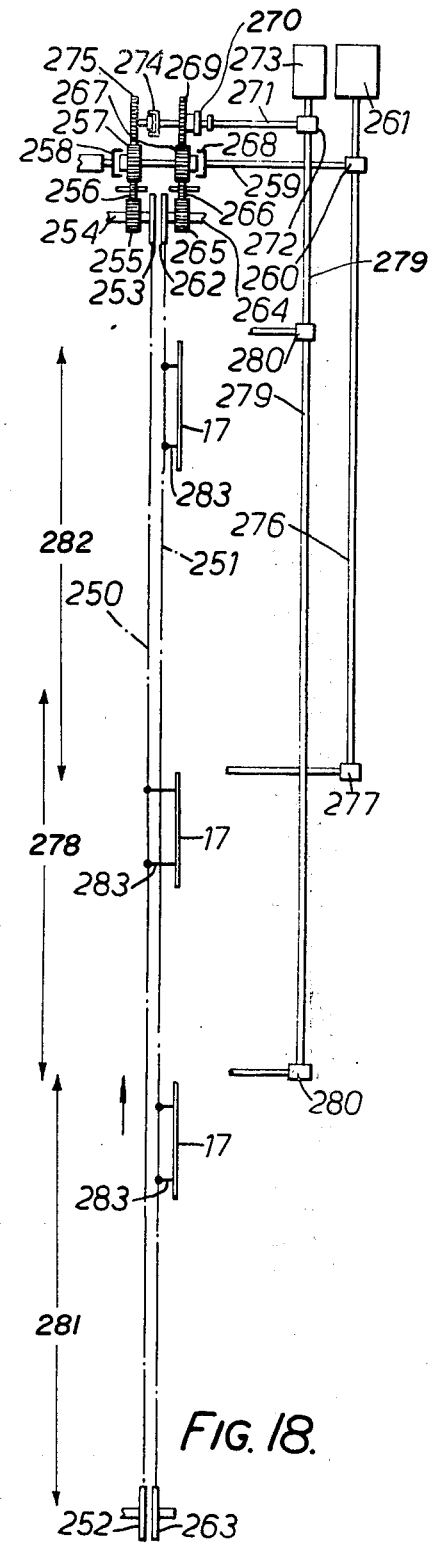
FIG. 18 is a diagrammatic plan view of two parallel support chains with chain drives.
Figure 19:
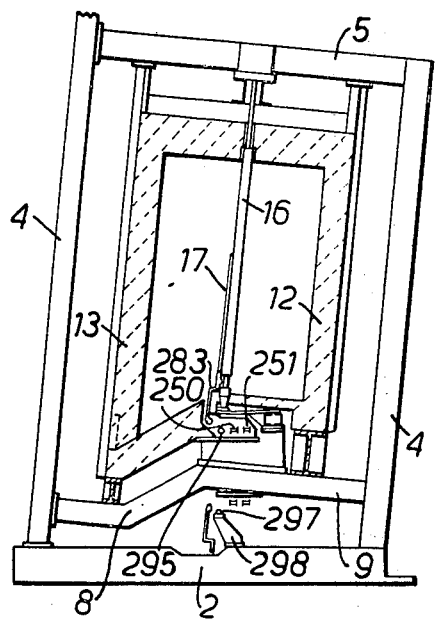
FIG. 19 is a section on line XIX—XIX of FIG. 17a showing the disposition of the chain drives in the furnace.

Supports 283 for the glass sheets are indicated diagrammatically in FIGS. 17 and 18 and are shown in more detail in FIG. 19, and are fixed to the chains 250 and 251 at spaced positions. In the embodiment illustrated the supports are in pairs, each pair of supports 283 being engaged by the lower edge of a single glass sheet 17.

Figure 20:
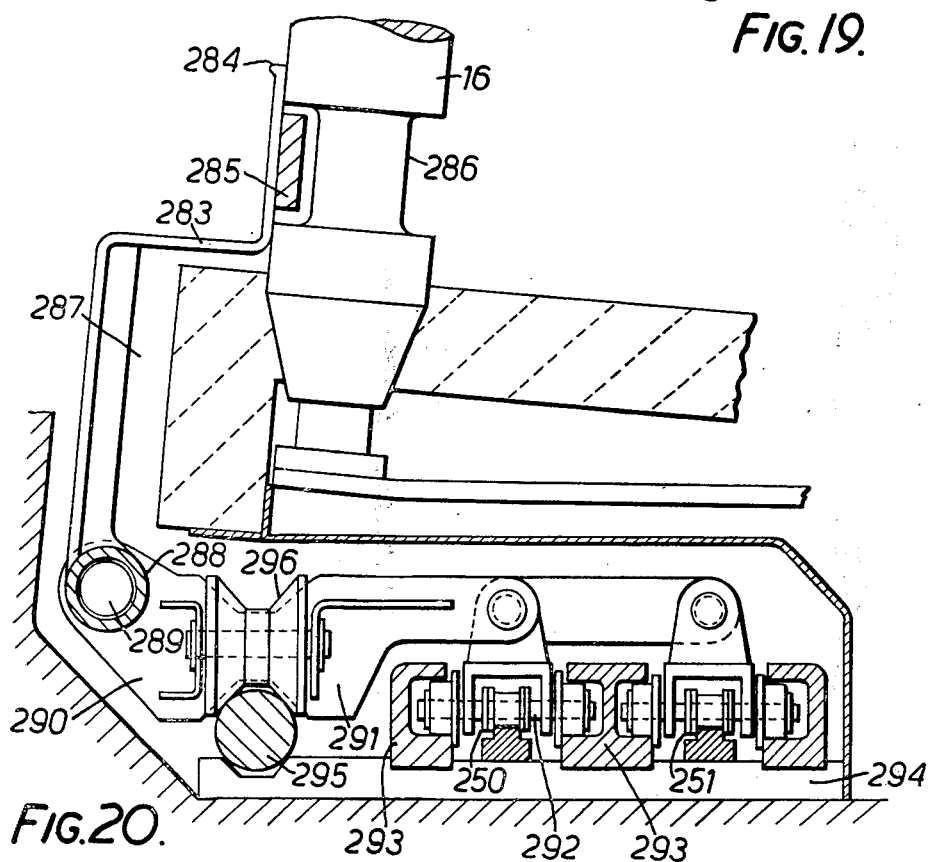
FIG. 20 is an enlarged view of part of FIG. 19 showing in detail the fixing and guiding of supports for a glass sheet which supports are attached to a chain drive.

The chains 250 and 251 are also shown in FIG. 20. The upper traverse of the chains is beneath the bearings for the support rollers 16 and the supports for the lower edge of the sheet are in the form of bent members the upper parts of which are illustrated in more detail in FIG. 20. Each support is bent inwardly and is formed in the same manner as the supports illustrated in FIG. 10 to receive the lower edge of a glass sheet 17 on the upper edge 284 of the support. Near this upper edge a guide block 285 is fixed to the inner face of the support which guide block runs in guide grooves 286 formed near the lower end of each of the rollers 16. Each of the support members 283 is strengthened by a web 287 at its lower end and is formed with an annular collar 288 to fit onto a shaft 289 which is fixed into a bracket 290 of a carriage member 291 which is attached by a dog 292 to the chain 250. The chains run in specially shaped guides 293 which are fixed to the lower part of the furnace structure on a base plate 294 and there is also mounted on the base plate 294 a guide rail 295 of circular cross-section on which runs a diabolo roller 296. The diabolo roller 296 running on the guide rail 295 and the guide block 285 running in the grooves 286 in the roller 16 serve to guide the supports 283 for the glass sheet.

The supports 283 attached to the second chain 251 are of similar construction although having longer carriage members 291 to extend from the chain 251 with diabolo guide rollers 296 running on the same guide rail 295.

FIG. 19 shows the lower return traverse of the chains 250 and 251 with the supports 283 inverted and with a further guide rail 297 mounted on supports 298 beneath the floor of the furnace to guide the running of the supports back to the inlet end of the furnace. The provision of the guide rails 295 and 297 for engagement by the rollers 296 on the supports, obviates the need for additional support for the chains between their end sprockets.

Another form of apparatus according to the invention is illustrated schematically in FIGS. 21a and 21b. This embodiment enables up to three sheets at a time to be processed in the apparatus thereby speeding up production.

The apparatus comprises upright support rollers 16 at a small angle for example about 5° to the vertical and bottom stub rollers 19 which are inclined to the horizontal in the same way as in the embodiment previously described. The sheets of glass to be toughened are each carried through the apparatus on carriages of the kind illustrated in FIGS. 10 and 11.

The apparatus is divided into sections and the first section which is the loading section outside the furnace comprises 10 upright rollers 16 and five bottom stub rollers 19. The upright roller 16 nearest to the furnace entrance is chain driven from the first upright roller 16 of a first section C1 of the conveyor rollers within an inlet section of the furnace.

This first conveyor section C1 comprises ten upright rollers 16 which are driven by three top gear boxes 300, the first of which drives the first four rollers 16, and the second and third of which each drives three rollers 16. The dirve to the gear boxes is from the hydraulic motor 92 the output shaft of which is connected to the right angle drive unit 89 from which a drive shaft transmits drive through the right angle drive unit 81 to input drive units 301 connected to the gear boxes 300.

A straight-through drive is transmitted from the motor 92 through the right angle drive unit 89 to a lower drive gear box 302 from which a drive shaft 303 extends to each of the four bottom stub rollers 19 in this first conveyor section C1.

The second conveyor section C2 is within a central section of the furnace and comprises fifteen upright rollers 16 which are driven in three groups of four rollers and one group of three rollers through four top gear boxes 304. The drive to the gear boxes is from a second hydraulic motor 305 which is connected to a right angle drive unit 306 from which a drive shaft transmits drive to the input drive units 309 of the gear boxes through a right angle drive unit 308. The motor 305 drives two bottom gear boxes 311 directly through the right angle drive unit 306, the gear boxes 311 having output shafts 312 which drive eight bottom rollers 19 which are located in the conveyor section C2.

The drive from the second motor 305 is extended by a coupling shaft 313 which is connected to one side of a first clutch 314 located between the second conveyor unit C2 and a third short conveyor unit C3 which comprises three upright rollers 16 and a single bottom stub roller 19. The three upright rollers are driven through a single top gear box 315 the drive to which is by a shaft 316 extending from a right angle drive unit 317 which is coupled by a shaft 318 to the other side of the first clutch 314.

The extension of the shaft 318 through the right angle drive unit 317 is coupled through a further right angled drive unit 319, which drives the shaft of the single bottom stub roller 19 of this section, to a shaft 320 coupled to one side of a second clutch 321 the other side of which is connected by a shaft 322 to the output of a lower gear box 323 which drives the shafts 324 of two bottom stub rollers 19 in a fourth conveyor section C4 within the furnace. This fourth section has four upright rollers 16 which are driven by a top gear box 325 which is coupled by a shaft 326 to an output drive from the lower gear box 323.

The conveyor within the furnace is completed by a fifth conveyor section C5 which is a short section comprising three upright rollers 16 and a single bottom stub roller 19. The three upright rollers are driven from a top gear box 327 which is itself driven by a coupling shaft 328 connected to a lower gear box 329 which is driven by a third hydraulic motor 330 and also provides the drive on a shaft 331 for the bottom stub roller 19.

An output shaft 332a from the bottom gear box 329 is coupled to the other side of the third clutch 332.

The first motor 92 operates in the same manner as already described, and can be driven for example at a slow speed to provide a carriage and glass speed of 0.025 m/sec., 0.4 m/sec. and 0.06 m/sec. Both the load section and the first section C1 of the furnace conveyor can be driven at any of these speeds under control of the switching sequence.

The second motor 305 is a fixed speed motor which drives the conveyor section C2 at a speed to provide a carriage and glass speed of 0.06 m/sec. This section C2 of the conveyor is therefore always being driven at the set furnace speed.

The third motor 330 can be driven at a speed to give a carriage and glass creep speed of 0.025 m/sec., and exit speed which is the same as the entry speed of 0.4 m/sec. and also the furnace speed of 0.06 m/sec.

The speed of operation of the conveyor sections C3, C4 and C5 in the outlet section of the furnace is governed by the state of actuation of the three clutches 314, 321 and 332. These may for example be electromagnetic clutches.

Operation begins with the motor 92 being driven to give a roller linear surface speed of 0.025 m/sec. and when a loaded carriage is released at the loading station it advances at the load creep speed towards the entrance to the furnace. On engagement of the first limit switch S1 located outside the furnace entrance by the carriage the motor 92 is accelerated to give a roller linear surface speed of 0.4 m/sec. thereby accelerating the glass into the furnace, the section C1 of the furnace then being driven to give a carriage and glass speed of 0.4 m/sec. to advance the cold sheet rapidly into the furnace. The second section C2 of the conveyor is running at a roller linear surface speed of 0.06 m/sec. at which speed the glass is heated as it is advanced through the furnace for a predetermined time at that speed set in the timer T2, and after actuation of the switch S2 the speed of motor 92 is dropped to reduce the section C1 of the furnace conveyor to the roller linear surface speed of 0.06 m/sec. at which speed advance of the glass continues on the second conveyor section C2 which always operates at that speed.

When the glass sheet has advanced on to conveyor section C2, section C1 is ready to receive the next sheet and its speed is reduced to the load creep speed of 0.025 m/sec. and the next glass is loaded at the load station.

At this stage the first clutch 314 is engaged and the second clutch 321 is disengaged so that the conveyor section C3 is also running at the roller linear surface speed of 0.06 m/sec.

Meanwhile the third motor 330 is running to drive the conveyor sections C4 and C5 at the higher exit speed so that the preceding glass is that time being accelerated and advanced rapidly through the exit from the furnace to the blowing frames 37.

The third clutch 332 is engaged so that the sections C4 and C5 are both running at the higher exit speed.

When the sheet is within the blowing frames the motor 330 is decelerated to drive the sheet between the blowing frames at a speed of 0.06 m/sec., the third clutch 332 being disengaged and the second clutch 321 is engaged so that the conveyor section C4 is now also running at a carriage speed of 0.06 m/sec. ready to receive the hot glass sheet whose leading edge is advancing from the conveyor section C3 on the conveyor section C4.

The advance of the glass continues until the leading edge reaches the end of conveyor section C5. The trailing edge of the sheet has now passed the end of the conveyor section C2, and at the end of the preset time for heating the sheet without deformation a timer causes the first clutch 314 to be disengaged while the second clutch 322 remains engaged, the third clutch 332 is re-engaged, and the third motor 330 is accelerated to drive the conveyor sections C3, C4 and C5 at exit speed thus accelerating the hot glass out of the furnace to a position between the blowing frames, where the speed of the final section C5 of the conveyor is reduced and the glass is quenched as it passes beneath the blowing frames.

Meanwhile as a hot glass sheet is being accelerated out of the furnace the next sheet is advancing through the furnace on conveyor section C2 at furnace speed of 0.06 m/sec. and conveyor section C1 and the load section have been returned to the load creep speed in preparation for the loading of the next glass sheet. Thus there are three glasses at a time in the apparatus and process time is considerably reduced.

The second and third motors may be hydraulic motors of the same kind as the motor 92 and driven in the same manner under control of switching circuits activated by the limit switches positioned in the conveyor sections and associated preset timers.

Alternatively, the motors may be electric motors which are controlled by pulse counting circuits in which counters are set to control the time intervals for operation on the motors at their different speeds.

In a further embodiment the motors may be electric motors whose speed is controlled by thyristor circuits with facilities for matching the speed of the three motors. Again speed changes are initiated by the carriage 18 as it passes through the furnace and operates limit switches.

The invention thus provides a furnace for heating glass prior to a toughening process or a bending and toughening process which has low capital cost and heats the glass while in a near upright position for subsequent processing between upright blowing frames or bending dies. When the glass is bent between upright bending dies the bent glass can be lowered subsequently into a body of quenching liquid.

It has been found that distortion and marking of the glass is minimal being very much less than in a conventional horizontal roller hearth system because surface contact of the glass with the rollers is limited to the restricted top area of the glass where it relaxes against the upright rollers.

We claim:

1. Apparatus for heating glass sheets, for example for bending and/or toughening, comprising:

a heating furnace through which glass sheets are to be conveyed in upright disposition;

a conveyor for the sheets extending through the furnace and including a movable support for the lower edge of a sheet and a plurality of spaced-apart near-vertical rollers defining an inclined support extending through the furnace against which a sheet can relax as it is heated; and driving means for advancing the movable support through the furnace and for driving said near-vertical rollers at a linear surface speed the same as that of the movable support.

2. Apparatus according to claim 1, including:

a plurality of bearing blocks for the lower ends of the near-vertical rollers each housing the lower bearings of a group of adjacent rollers;

a corresponding number of gear boxes each connected to the upper ends of one of said groups of rollers; and means for adjusting the disposition of said bearing blocks and gear boxes relative to each other to align all the near-vertical rollers at a predetermined angle to the vertical.

3. Apparatus according to claim 2, wherein the bearing blocks and the gear boxes are mounted on slides and adjuster rods are connected to the bearing blocks and the gear boxes to facilitate remote adjustment of their positions in those slides.

4. Apparatus according to claim 1, wherein the driving means includes an hydraulic motor whose output is connected to the gear boxes.

5. Apparatus according to claim 1, wherein the conveyor includes an endless chain drive means connected to said driving means, supports for the lower edge of a glass sheet are fixed to said chain at spaced positions, and guide means is arranged to guide the supports along a path offset from the near-vertical rollers by a distance which determines the angle at which a glass sheet supported thereon leans against the rollers.

6. Apparatus according to claim 5, including means for varying the speed of the chain through the furnace.

7. Apparatus according to claim 5, including a second endless chain carrying spaced supports for a glass sheet and extending through the furnace parallel to and closely adjacent the first chain, means for driving the near-vertical rollers at different speeds in different parts of the furnace, and separate drive means for the second chain whereby successive glass sheets can be advanced simultaneously through different parts of the furnace at different speeds.

8. Apparatus according to claim 1, wherein the furnace includes banks of electrical heaters facing opposite sides of the path of travel of glass sheets through the furnace, which heaters are connected together in groups, and a temperature sensor associated with each group which temperature sensor is connected to a regulating circuit for regulating the supply of electric current to that group of heaters.

9. Apparatus for heating glass sheets, for example for bending and/or toughening, comprising:

a heating furnace through which glass sheets are to be conveyed in upright disposition;

a plurality of spaced-apart near-vertical rollers defining an inclined support extending through the furnace against which rollers a glass sheet can relax as it is heated;

a plurality of bottom rollers defining a track for a carriage supporting the glass sheet which bottom rollers project through spaces between the near-vertical rollers and are mounted at an acute angle thereto;

a mobile carriage providing support for the lower edge of the glass sheet and having faces at an angle matching the acute angle between said bottom rollers and said near-vertical rollers, which faces engage frictionally both the bottom rollers and the near-vertical rollers; and driving means connected to the near-vertical rollers and to the bottom rollers to rotate each of said rollers so that they all have the same effective linear surface speed.

10. Apparatus according to claim 9, wherein the bottom rollers are stub rollers which are connected in groups to gear boxes constituting part of said driving means.

11. Apparatus according to claim 10, including means for adjusting the extent of projection of each of the stub rollers through the near-vertical rollers to align the stub rollers to form said track for engagement by a face of the carriage.

12. Apparatus according to claim 9, wherein the face of the carriage which engages the near-vertical rollers has support shoulders on its upper edge adapted for engagement by the lower edge of a glass sheet.

13. Apparatus for heating glass sheets for example for bending and/or toughening, comprising:

an elongate heating furnace including banks of electrical heaters facing opposite sides of a horizontal path of travel of glass sheets through the furnace;

a plurality of spaced-apart near-vertical rollers defining an inclined support extending through the furnace between the banks of heaters;

a mobile support for the lower edge of a sheet;

means for advancing said mobile support through the furnace with a glass sheet carried thereby leaning against said rollers as it traverses its path of travel; and driving means for advancing the mobile support through the furnace and for driving said near-vertical rollers at a linear surface speed the same as that of the mobile support.

14. Apparatus for heating a succession of glass sheets, for example for bending and/or toughening, comprising:

a heating furnace through which a succession of glass sheets is to be conveyed in upright disposition;

a conveyor for the sheets extending through the furnace and including movable supports for the lower edges of the sheets and a plurality of spaced-apart near-vertical rollers defining an inclined support extending through the furnace against which the sheets can relax as they are heated; and driving means for advancing the movable supports through the furnace and for driving groups of said near-vertical rollers at different speeds in different parts of the furnace whereby successive glass sheets can be advanced simultaneously through different parts of the furnace at different speeds.

15. A method of heating a glass sheet to a thermal condition for further processing, the method utilizing means operable to provide support for the lower edge of the sheet during movement through a heating zone, and upwardly projecting, movable, transient mechanical supporting means extending along the heating zone and inclined at a small angle to the vertical, the method comprising:

seating the lower edge of the glass sheet on the lower edge support means;

leaning the upper edge of the sheet against said transient mechanical supporting means with the sheet at a small angle to the vertical;

driving the lower edge support means and the upwardly projecting transient mechanical supporting means to advance the supported glass sheet through the heating zone;

applying heat to the advancing glass sheet in the heating zone;

controlling the heat transfer to the glass sheet during its advance through the heating zone to induce sufficient heat transfer to the advancing glass sheet for achieving said thermal condition for further processing while the advancing sheet relaxes against the transient mechanical supporting means; and as the sheet is heated to said thermal condition and relaxes against said transient mechanical supporting means, timing the advance of the supported glass sheet through the heating zone to limit deformation of the sheet to an amount less than the maximum deformation which is acceptable in the processed glass sheet.

16. A method of heating a glass sheet to a thermal condition for further processing, the method utilizing means operable to provide support for the lower edge of the sheet during movement through a heating zone, and upwardly projecting, movable, transient mechanical supporting means extending along the heating zone and providing an effective support plane inclined at a small angle to the vertical, the method comprising:

seating the lower edge of the glass sheet on the lower edge support means;

leaning the upper edge of the sheet against said transient mechanical supporting means with the sheet at a small angle to the vertical;

positioning the lower edge of the sheet on said lower edge support means to offset the lower edge of the sheet from said effective support plane so that the sheet is at a small angle to said plane;

driving the lower edge support means and the upwardly projecting transient mechanical supporting means to advance the supported glass sheet through the heating zone; applying heat to the advancing glass sheet in the heating zone;

controlling the heat transfer to the glass sheet during its advance through the heating zone to induce sufficient heat transfer to the advancing glass sheet for achieving said thermal condition for further processing while the advancing sheet relaxes into further contact with the transient mechanical supporting means; and as the sheet is heated to said thermal condition and relaxes into further contact with said transient mechanical supporting means, timing the advance of the supported glass sheet through the heating zone to limit deformation of the sheet to an amount less than the maximum deformation which is acceptable in the processed glass sheet.

17. A method according to claim 16 wherein the upper edge of the sheet is leaned against transient mechanical supporting means comprising spaced apart, near-vertical support rollers, and the lower edge support means is advanced when driven, and wherein the near-vertical support rollers are driven at a rate such that their linear surface speed is the same as the speed of advance of the lower edge support means.

18. A method according to claim 17 wherein the advance of the supported glass sheet through the heating zone is timed in dependence on the glass thickness, the height of the glass sheet, the angle of the spaced apart support rollers to the vertical, and the amount of offset of the lower edge of the glass sheet from said support rollers, to prevent bulging of the sheet in excess of about 0.5mm as the sheet relaxes into contact with said support rollers.

19. A method according to claim 18 wherein the glass sheet is of soda-lime-silica composition and is heated to a temperature in the range 580°C to 700°C, and wherein the lower edge of the sheet is positioned on the lower edge support means so that the sheet is at an angle of from 2° to 10° to the vertical.

20. A method according to claim 19 wherein the glass sheet is of soda-lime-silica composition and is heated to a temperature in the range 580°C to 680°C, and wherein the hot sheet is transported from the heating zone to a quenching zone where the hot sheet is quenched to toughen the glass.

21. A method according to claim 20, comprising quenching the glass by directing flows of cooling gas against the glass surfaces.

22. A method according to claim 19 wherein the glass sheet is of soda-lime-silica composition and is heated to a temperature in the range 580°C to 680°C, and wherein the hot sheet is conveyed from the heating zone to a bending zone where the sheet is bent to a predetermined curvature.

23. A method according to claim 22, comprising quenching the bent glass sheet to produce a bent and toughened glass sheet.

24. A method according to claim 23, comprising quenching the bent glass sheet in a chilling liquid.

25. A method according to claim 18 of heating to a thermal condition for subsequent bending and/or toughening, each sheet of a succession of glass sheets advancing through said heating zone, wherein:
the advance of each supported glass sheet through the heating zone is timed to prevent bulging of each sheet in excess of about 0.5mm as each sheet relaxes during heating into contact with said support rollers;
groups of said near-vertical support rollers are driven at different speeds in different parts of the heating zone; and
the lower edge support means of successive glass sheets are advanced simultaneously through different parts of the heating zone at different speeds matching the different speeds of the groups of near-vertical support rollers.

26. A method according to claim 25 wherein:
a group of said near-vertical support rollers in a central section of the heating zone is driven at a set speed;
an inlet group of said near-vertical support rollers in an inlet section of the heating zone is driven at a speed faster than said set speed to accelerate a first supported glass sheet into the heating zone;
said inlet group of rollers is slowed to said set speed to transfer the sheet to the central section;
the speed of said inlet group of rollers is reduced to receive a second supported glass sheet for acceleration into the inlet section of the heating zone when said first supported glass sheet is in the control section of the heating zone;
an outlet group of said near-vertical support rollers in an outlet section of the heating zone is driven at said set speed to receive said first sheet from the support rollers in the central section of the heating zone; and
when the first sheet is advancing through said outlet section of the heating zone, the speed of said outlet group of rollers is increased to accelerate the first sheet out of the heating zone while the second sheet is being transferred to the central section of the heating zone and a third sheet is supported in the inlet section of the heating zone.

27. A method of heating a glass sheet to a thermal condition for further processing, the method utilizing means operable to provide support for the lower edge of the sheet during movement through a heating zone, and upwardly projecting, movable, transient mechanical supporting means extending along the heating zone and providing an effective support plane inclined at a small angle to the vertical, the method comprising:
seating the lower edge of the glass sheet on the lower edge support means;
leaning the upper edge of the sheet against said transient mechanical supporting means with the sheet at a small angle to the vertical;
positioning the lower edge of the sheet on said lower edge support means to offset the lower edge of the sheet from said effective support plane so that the sheet is at a small angle to said plane;
driving the lower edge support means and the upwardly projecting mechanical supporting means to advance the supported sheet through the heating zone;
applying heat to the advancing glass sheet in the heating zone;
controlling the heat transfer to the glass sheet during its advance through the heating zone to induce sufficient heat transfer to the advancing glass sheet for achieving said thermal condition for further processing while the advancing sheet relaxes into further contact with the transient mechanical supporting means; and
as the sheet is heated to said thermal condition and relaxes into further contact with said transient mechanical supporting means, timing the advance of the supported glass sheet through the heating zone to limit relaxation of the sheet against said transient mechanical supporting means to an amount such that the value of a deformation index of the hot glass sheet represented by $$\int \frac{dt}{\eta(t)}$$

where: $t$ is the heating time in seconds, and $\eta(t)$ is the viscosity of the glass in poises at time $t$ after commencement of heating;
is less than a critical value of said deformation index determined by deformation of the sheet by an amount less than the maximum deformation which is acceptable in the processed glass sheet.

28. A method according to claim 27, of heating a glass sheet of soda-lime-silica composition of thickness in the range 2.2mm to 4mm and height at most 0.76m, wherein:
the upper edge of the sheet is leaned against said transient mechanical supporting means which has an effective support plane inclined at an angle of 5° to the vertical;

the lower edge of the sheet is positioned on said lower edge support means so that the lower edge of the sheet is offset 2mm from said effective support plane; and the advance of the glass sheet through the heating zone is timed so that the value of the deformation index of the sheet when it achieves said thermal condition for further processing is in the range $3.8 \times 10^{-9}$ to $12.7 \times 10^{-9}$.

29. A method according to claim 27, of heating a sheet of soda-lime-silica glass whose thickness is in the range 2.2mm to 15mm and whose height is at most 0.76m to a temperature in the range 580°C to 680°C, wherein:

the upper edge of the sheet is leaned against said transient mechanical supporting means having an effective support plane inclined at an angle of 5° to the vertical;

the lower edge of the sheet is positioned on said lower edge support means so that the lower edge of the sheet is offset 2mm from said effective support plane; and the advance of the glass sheet through the heating zone is timed so that the value of the deformation index of the sheet when it achieves said thermal condition for further processing is in the range $3.8 \times 10^{-9}$ to $180 \times 10^{-9}$.

30. A method according to claim 27, of heating a sheet of soda-lime-silica glass whose thickness is in the range 6mm to 15mm and whose height is at most 0.61m to a temperature of about 700°C, wherein:

the upper edge of the sheet is leaned against said transient mechanical supporting means having an effective support plane inclined at an angle of 10° to the vertical;

the lower edge of the sheet is positioned on said lower edge support means so that the lower edge of the sheet is offset about 2mm from said effective support plane; and the advance of the glass sheet through the heating zone is timed so that the value of the deformation index of the sheet when it achieves said thermal condition for further processing is in the range $89.3 \times 10^{-9}$ to $544 \times 10^{-9}$.

31. A method according to claim 27 wherein the advance of the supported glass sheet through the heating zone is timed to limit said relaxation of the sheet to an amount such that the value of the deformation index of the hot glass sheet is less than a critical value of deformation index determined by a bulge in said sheet less than about 0.5mm.

32. A method of heating a glass sheet to a thermal condition for further processing, the method utilizing means operable to provide support for the lower edge of the glass sheet during movement through a heating zone, and upwardly projecting transient mechanical supporting means extending along the heating zone and comprised of spaced apart, rotatable, support rollers which are inclined at a small angle to the vertical, the method comprising:

seating the lower edge of the glass sheet on the lower edge support means;

leaning the upper edge of the sheet against the spaced apart support rollers with the sheet at a small angle to the vertical;

rotating the support rollers and driving the lower edge support means to advance the supported glass sheet through the heating zone;

applying heat to the advancing glass sheet in the heating zone;

controlling the heat transfer to the glass sheet during its advance through the heating zone to induce sufficient heat transfer to the advancing glass sheet for achieving said thermal condition for further processing while the advancing sheet relaxes against said support rollers; and as the sheet is heated to said thermal condition and relaxes against said spaced apart support rollers, timing the advance of the supported glass sheet through the heating zone to limit deformation of the sheet to an amount less than the maximum deformation which is acceptable in the processed glass sheet.

33. A method according to claim 32 wherein the lower edge support means and the supported sheet are rapidly advanced into the heating zone, the lower edge support means and the supported sheet are advanced through the heating zone at a slower speed when the trailing edge of the sheet has entered the heating zone, and the lower edge support means and the supported sheet are accelerated out of the heating zone when the sheet has been heated to said thermal condition for further processing.

* * * * *